(12) United States Patent
Caveney et al.

(10) Patent No.: US 9,669,828 B2
(45) Date of Patent: Jun. 6, 2017

(54) COOPERATIVE DRIVING AND COLLISION AVOIDANCE BY DISTRIBUTED RECEDING HORIZON CONTROL

(75) Inventors: Derek Stanley Caveney, Plymouth, MI (US); William Bruce Dunbar, Santa Cruz, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 963 days.

(21) Appl. No.: 13/486,598

(22) Filed: Jun. 1, 2012

(65) Prior Publication Data

US 2013/0325306 A1 Dec. 5, 2013

(51) Int. Cl.
| | |
|---|---|
| *G08G 1/16* | (2006.01) |
| *B60W 30/095* | (2012.01) |
| *G05D 1/02* | (2006.01) |
| *G05D 1/10* | (2006.01) |
| *G08G 1/00* | (2006.01) |

(52) U.S. Cl.
CPC .... *B60W 30/0956* (2013.01); *B60W 30/0953* (2013.01); *G05D 1/0289* (2013.01); *G05D 1/0295* (2013.01); *G05D 1/104* (2013.01); *G08G 1/22* (2013.01)

(58) Field of Classification Search
CPC .... G05D 1/0295; G05D 1/104; G05D 1/0289; G05D 2201/0213; B60W 30/09; B60W 30/095
USPC ................ 701/1, 2, 24, 25, 26, 28, 300, 301
See application file for complete search history.

(56) References Cited

U.S. PATENT DOCUMENTS

| | | | |
|---|---|---|---|
| 7,248,952 B2 | 7/2007 | Ma et al. | |
| 7,418,372 B2 | 8/2008 | Nishira et al. | |
| 7,756,615 B2 | 7/2010 | Barfoot et al. | |
| 8,249,799 B2* | 8/2012 | Flotte | G08G 5/0021 340/945 |
| 8,788,121 B2* | 7/2014 | Klinger | 701/3 |

(Continued)

OTHER PUBLICATIONS

Felipe Nunez et al., "Model Predictive Control of Multi-Line Metro Systems: A Distributed Approach", 2011 9th IEEE International Conference on Control and Automation (ICCA), Santiago, Chile, Dec. 19-21, 2011, pp. 532-537.

(Continued)

*Primary Examiner* — Khoi Tran
*Assistant Examiner* — Robert Nguyen
(74) *Attorney, Agent, or Firm* — Oblon, McClelland, Maier & Neustadt, L.L.P.

(57) ABSTRACT

Distributed control of vehicles with coordinating cars that implement a cooperative control method, and non-coordinating cars that are presumed to follow predictable dynamics. A cooperative control method can combine distributed receding horizon control, for optimization-based path planning and feedback, with higher level logic, to ensure that implemented plans are collision free. The cooperative method can be completely distributed with partially synchronous execution, and can afford dedicated time for communication and computation, features that are prerequisites for implementation on real freeways. The method can test for conflicts and can calculate optimized trajectories by adjusting parameters in terminal state constraints of an optimal control problem.

19 Claims, 9 Drawing Sheets
(5 of 9 Drawing Sheet(s) Filed in Color)

(56) References Cited

U.S. PATENT DOCUMENTS

| | | | |
|---|---|---|---|
| 2005/0088318 A1* | 4/2005 | Liu | G08G 1/161 340/902 |
| 2008/0065328 A1* | 3/2008 | Eidehall | G01S 7/295 701/301 |
| 2009/0079839 A1 | 3/2009 | Fischer et al. | |
| 2009/0319112 A1* | 12/2009 | Fregene | B60W 30/16 701/25 |
| 2010/0094481 A1 | 4/2010 | Anderson | |
| 2010/0114633 A1* | 5/2010 | Sislak | G06Q 10/047 701/120 |
| 2010/0121576 A1* | 5/2010 | Aso | G01S 13/726 701/301 |
| 2010/0131121 A1* | 5/2010 | Gerlock | G08G 5/0013 701/2 |
| 2010/0228419 A1* | 9/2010 | Lee | B60W 30/0953 701/25 |
| 2011/0029235 A1 | 2/2011 | Berry | |
| 2012/0010768 A1 | 1/2012 | Phillips et al. | |
| 2012/0306663 A1* | 12/2012 | Mudalige | G08G 1/163 340/903 |
| 2013/0054128 A1* | 2/2013 | Moshchuk | G08G 1/167 701/301 |
| 2013/0218365 A1* | 8/2013 | Caveney | G05D 1/0295 701/1 |
| 2013/0238170 A1* | 9/2013 | Klinger | G05D 1/104 701/3 |
| 2013/0325210 A1* | 12/2013 | Palm | G05D 1/0289 701/2 |

OTHER PUBLICATIONS

Hojjat A. Izadi et al., "Decentralized Receding Horizon Control of Multiple Vehicles subject to Communication Failure", 2009 American Control Conference, St. Louis, MO, US, Jun. 10-12, 2009, pp. 3531-3536.
Wei Li et al., "Centralized and distributed cooperative Receding Horizon control of autonomous vehicle missions", Mathematical and Computer Modeling 43 (2006) 1208-1228.
Hiroaki Fukushima et al., "Distributed Model Predictive Control for Multi-Vehicle Formation with Collision Avoidance Constraints", Proceedings of the 44th IEEE Conference on Decision and Control, and the European Control Conference 2005, Seville, Spain, Dec. 12-15, 2005, pp. 5480-5485.
L. D. Baskar, B. De Schutter, J. Hellendoorn, and Z. Papp. Traffic control and intelligent vehicle highway systems: a survey. Intelligent Transport Systems, IET, 5(1):38-52, Mar. 2011.
O. Becker. Tutorial—2D Rotated Rectangles Collision Detection, 2003. url: www.ragestorm.net/tutorial?id=22.
R. Bishop. Intelligent vehicle applications worldwide. IEEE Transactions on Intelligent Systems and their Applications, 15(1):78-81, Jan.
W. B. Dunbar and R. M. Murray. Distributed receding horizon control for multi-vehicle formation stabilization. Automatica, 42(4):549-558, 2006.
P. Falcone, F. Borrelli, E. H. Tseng, J. Asgari, and H. Davor. Low complexity MPC schemes for integrated vehicle dynamics control problems. In Proceedings of the 9th International Symposium on Advanced Vehicle Control (AVEC '08), pp. 875-880, 2008.
R. A. Ferlis. The dream of an automated highway. Public Roads, 71(1), Pub. No. FHWA-HRT-07-005 2007.

E. Franco, L. Magni, T. Parisini, M.M. Polycarpou, and D. M. Raimondo. Cooperative constrained control of distributed agents with nonlinear dynamics and delayed information exchange: A stabilizing receding-horizon approach. IEEE Trans. on Automatic Control, 53(1):324-338, 2008.
T. Keviczky, F. Borrelli, and G. J. Balas. Decentralized receding horizon control for large scale dynamically decoupled systems. Automatica, 42(12):2105-2115, Dec. 2006.
N. J. Kohut, J. K. Hedrick, and F. Borrelli. Integrating traffic data and model predictive control to improve fuel economy. In Proceeding of 12th IFAC Symposium on Control in Transportation Systems, pp. 2806-2813, 2009.
Y. Kuwata, A. G. Richards, T. Schouwenaars, and J. P. How. Distributed robust receding horizon control for multi-vehicle guidance. IEEE Transactions on Control Systems Technology, 15(4), Jul. 2007.
D. Q. Mayne, J. B. Rawlings, C. V. Rao, and P. O. M. Scokaert. Constrained model predictive control: Stability and optimality. Automatica, 36:789-814, 2000.
M. B. Milam, K. Mushambi, and R. M. Murray. A new computational approach to real-time trajectory generation for constrained mechanical systems. In Proceedings of the Conference on Decision and Control, 2000.
N. Petit, M. B. Milam, and R. M. Murray. Inversion based trajectory optimization. In Proceedings of the IFAC Symposium on Nonlinear Control Systems Design (NOLCOS), 2001.
A. Richards and J. How. Robust model predictive control with imperfect information. In Proceedings of the American Control Conference, 2005.
A. G. Richards, J. P. How, T. Schouwenaars, and E. Feron. Spacecraft trajectory planning with avoidance constraints using mixed-integer linear programming. AIAA Journal of Guidance Control and Dynamics, 25(4):755-764, 2002.
B. Saerens, M. Diehl, J. Swevers, and E. Van den Bulck. Model predictive control of automotive powertrains—first experimental results. In Proceedings of the 47th IEEE Conference on Decision and Control, pp. 5692-5697, 2008.
J. D. Schwartz and M. B. Milam. On-line path planning for an autonomous vehicle in an obstacle filled environment. In Proceedings of the IEEE Conference on Decision and Control, pp. 2806-2813, 2008.
R. Sengupta, S. Rezaei, S. E. Shladover, D. Cody, S. Dickey, and H. Krishnan. Cooperative collision warning systems: Concept definition and experimental implementation. Journal of Intelligent Transportation Systems, 11(3):143-155, 2007.
S. E. Shladover. Path at 20—History and major milestones. IEEE Transactions on Intelligent Transportation Systems, 8(4):584-592, Dec. 2007.
A. Vahidi and A. Eskandarian. Research advances in intelligent collision avoidance and adaptive cruise control. Intelligent Transportation Systems, IEEE Transactions on, 4(3):143-153, Sep. 2003.
Y. Wang and S. Boyd. Fast model predictive control using online optimization. IEEE Transactions on Control Systems Technology, 18(2):267-278, 2010.
Dunbar, William B. And Caveney, Derek S., Distributed Receding Horizon Control of Vehicle Platoons: Stability and String Stability, IEEE Transactions on Automatic Control, vol. 57, No. 3, pp. 620-633, Mar. 2012.
Dunbar, William B. And Murray, Richard M., Distributed Receding Horizon Control with Application to Multi-Vehicle Formation Stabilization, Automatica, 47 pgs, Jan. 26, 2004.

* cited by examiner

COOPERATIVE DRIVING AND COLLISION AVOIDANCE BY DISTRIBUTED RECEDING HORIZON CONTROL

BACKGROUND

This disclosure relates to distributed receding horizon control (DRHC) and collision avoidance of coordinating and non-coordinating vehicles.

The "background" description provided herein is for the purpose of generally presenting the context of the disclosure. Work described herein, to the extent it is described in this background section, as well as aspects of the description which may not otherwise qualify as prior art at the time of filing, are neither expressly or impliedly admitted as prior art.

Aspects of this disclosure relate to the teachings of the following references, which are referred to throughout:

[1] L. D. Baskar, B. De Schutter, J. Hellendoorn, and Z. Papp. Traffic control and intelligent vehicle highway systems: a survey. Intelligent Transport Systems, IET, 5(1):38-52, March 2011.
[2] O. Becker. Tutorial-2D Rotated Rectangles Collision Detection, 2003. url: www(dot)ragestorm(dot)net/tutorial?id=22.
[3] R. Bishop. Intelligent vehicle applications worldwide. IEEE Transactions on Intelligent Systems and their Applications, 15(1):78-81, January
[4] W. B. Dunbar and D. Caveney. Distributed receding horizon control of vehicle platoons: Stability and string stability. IEEE Trans. on Automatic Control, In press, DOI 10.1109/TAC.2011.2159651, June 2011.
[5] W. B. Dunbar and R. M. Murray. Distributed receding horizon control for multi-vehicle formation stabilization. Automatica, 42(4):549-558, 2006.
[6] P. Falcone, F. Borrelli, E. H. Tseng, J. Asgari, and H. Davor. Low complexity MPC schemes for integrated vehicle dynamics control problems. In Proceedings of the 9th International Symposium on Advanced Vehicle Control (AVEC '08), pages 875-880, 2008.
[7] R. A. Ferlis. The dream of an automated highway. Public Roads, 71(1), Pub. No. FHWA-HRT-07-005 2007.
[8] E. Franco, L. Magni, T. Parisini, M. M. Polycarpou, and D. M. Raimondo. Cooperative constrained control of distributed agents with nonlinear dynamics and delayed information exchange: A stabilizing receding-horizon approach. IEEE Trans. on Automatic Control, 53(1):324-338, 2008.
[9] P. Ioannou, editor. Automated Highway Systems. Plenum Press, New York, 1997.
[10] T. Keviczky, F. Borrelli, and G. J. Balas. Decentralized receding horizon control for large scale dynamically decoupled systems. Automatica, 42(12):2105-2115, December 2006.
[11] N. J. Kohut, J. K. Hedrick, and F. Borrelli. Integrating traffic data and model predictive control to improve fuel economy. In Proceeding of 12th IFAC Symposium on Control in Transportation Systems, pages 2806-2813, 2009.
[12] Y. Kuwata, A. G. Richards, T. Schouwenaars, and J. P. How. Distributed robust receding horizon control for multi-vehicle guidance. IEEE Transactions on Control Systems Technology, 15(4), July 2007.
[13] D. Q. Mayne, J. B. Rawlings, C. V. Rao, and P. O. M. Scokaert. Contrained model predictive control: Stability and optimality. Automatica, 36:789-814, 2000.
[14] M. B. Milam, K. Mushambi, and R. M. Murray. A new computational approach to real-time trajectory generation for constrained mechanical systems. In Proceedings of the Conference on Decision and Control, 2000.
[15] Intelligent Transportation Systems (ITS) Joint Program Office. Intellidrive safety workshop. U.S. Department of Transportation, Research and Innovative Technology Administration, http://www.its.dot.gov/, July 2010.
[16] N. Petit, M. B. Milam, and R. M. Murray. Inversion based trajectory optimization. In Proceedings of the IFAC Symposium on Nonlinear Control Systems Design (NOLCOS), 2001.
[17] A. Richards and J. How. Robust model predictive control with imperfect information. In Proceedings of the American Control Conference, 2005.
[18] A. G. Richards, J. P. How, T. Schouwenaars, and E. Feron. Spacecraft trajectory planning with avoidance constraints using mixed-integer linear programming. AIAA Journal of Guidance Control and Dynamics, 25(4):755-764, 2002.
[19] B. Saerens, M. Diehl, J. Swevers, and E. Van den Buick. Model predictive control of automotive powertrains—first experimental results. In Proceedings of the 47th IEEE Conference on Decision and Control, pages 5692-5697, 2008.
[20] J. D. Schwartz and M. B. Milam. On-line path planning for an autonomous vehicle in an obstacle filled environment. In Proceedings of the IEEE Conference on Decision and Control, pages 2806-2813, 2008.
[21] R. Sengupta, S. Rezaei, S. E. Shladover, D. Cody, S. Dickey, and H. Krishnan. Cooperative collision warning systems: Concept definition and experimental implementation. Journal of Intelligent Transportation Systems, 11(3):143-155, 2007.
[22] S. E. Shladover. PATH at 20-History and major milestones. IEEE Transactions on Intelligent Transportation Systems, 8(4):584-592, December 2007.
[23] Technical showcase. Raytheon: Infrastructure BSM generator for V2V. In 18th World Congress on Intelligent Transport Systems, October 2011.
[24] A. Vahidi and A. Eskandarian. Research advances in intelligent collision avoidance and adaptive cruise control. Intelligent Transportation Systems, IEEE Transactions on, 4(3):143-153, September 2003.
[25] Y. Wang and S. Boyd. Fast model predictive control using online optimization. IEEE Transactions on Control Systems Technology, 18(2):267-278, 2010.

SUMMARY

An aspect of this disclosure considers the problem of distributed control of vehicles with coordinating cars that implement a cooperative control method, and non-coordinating cars that are presumed to follow predictable dynamics. The cooperative control method presented combines distributed receding horizon control, for optimization-based path planning and feedback, with higher level logic, to ensure that implemented plans are collision free. The cooperative method is completely distributed with partially synchronous execution, and affords dedicated time for communication and computation, features that are prerequisites for implementation on real freeways. Merging simulations with coordinating and non-coordinating cars demonstrate the viability of the method, including a detailed six-car merging scenario, and a larger-scale merge that models the Japanese Tomei Expressway road geometry and traffic flow conditions. The look-ahead feature of receding horizon control is exploited for resolving conflicts (future collisions) before they occur, and for negotiating aspects of inter-vehicle merging coordination, even before the closed-loop response is initiated. Such capabilities are not possible by any other method that simultaneously provides low-level control.

An embodiment of controller for a first coordinating vehicle can include a communication terminal configured to receive trajectory messages from a plurality of second coordinating vehicles in a communication range. The trajectory messages can include vehicle trajectory information for a predetermined update interval.

The controller can include a computer processor configured to execute instructions stored on a non-transitory memory. The instructions can include calculating an assumed trajectory for the first coordinating vehicle by solving an optimal control problem, detecting a conflict based on the received trajectory information and the calculated assumed trajectory, and when a conflict is detected, adjusting terminal state constraints in the optimal control problem and calculating, with the adjusted constraints in the optimal control problem, an optimized trajectory for the first coordinating vehicle such that the detected conflict is resolved. The assumed trajectory for the first coordinating vehicle can be calculated by solving the optimization control problem with terminal constraints modified by a high-level maneuver plan. The optimal control problem can include cost terms including a move suppression (MS) term indicating an amount that the optimized trajectory may deviate from the assumed trajectory.

The controller can be further configured such that the conflict is detected by determining, based on the received trajectory information and the calculated assumed trajectory, whether a first avoidance boundary of the first coordinating vehicle and a second avoidance boundary of any one of the second coordinating vehicles intersect during the update interval.

The terminal state constraints in the optimal control problem can include a velocity term and a vehicle spacing term. When a conflict is detected, the processor can adjust the velocity term and/or the vehicle spacing term in the optimal control problem such that the detected conflict is resolved.

During each of successive update intervals, the computer processor can recursively detect conflicts between the first coordinating vehicle and each of the second coordinating vehicles that will occur during the update interval and calculate the optimized trajectory for each of the recursively detected conflicts. The assumed trajectory for the first coordinating vehicle in a current update interval can be initially set to the calculated optimized trajectory from an immediately preceding update interval. The assumed trajectory for the first coordinating vehicle in a current update interval can be initially set, in the absence of a high-level maneuver plan, by extrapolating the optimized trajectory from an immediately preceding update interval.

During each of the successive update intervals, the controller can calculate the optimized trajectory for the detected conflict with the earliest loss-of-separation that requires action by the first coordinating vehicle.

During each of the successive update intervals, the communication terminal can be configured to transmit the optimized trajectory to the second coordinating vehicles and receive updated trajectory messages from the second coordinating vehicles.

The controller can be further configured to classify the detected conflict based on a predetermined rule set and adjust the terminal state constraints based on the detected conflict classification. The conflict classification can be based on a position of the first coordinating vehicle relative to a conflicting vehicle, of the second coordinating vehicles, which is determined to be in conflict with the first coordinating vehicle. When a conflict is detected, the MS term can be set such that the amount from which the optimized trajectory may deviate from the assumed trajectory is infinite.

The controller can include a detection unit configured to detect a position and speed information for a non-coordinating vehicle within a predetermined detection range. The processor can determine trajectory information for the non-coordinating vehicle based on the detected position and speed information, and the processor can detect a conflict between the first coordinating vehicle and the non-coordinating vehicle based on the determined trajectory information and the assumed trajectory. The processor can be configured to set a third avoidance boundary for the non-coordinating vehicle, the third avoidance boundary being smaller in size than the first and second avoidance boundaries.

A method for controlling a first coordinating vehicle can comprise receiving trajectory messages from a plurality of second coordinating vehicles in a communication range, the trajectory messages including vehicle trajectory information for a predetermined update interval; calculating an assumed trajectory for the first coordinating vehicle by solving an optimal control problem; detecting a conflict based on the received trajectory information and the calculated assumed trajectory; and when a conflict is detected, adjusting terminal state constraints in the optimal control problem and calculating, with the adjusted constraints in the optimal control problem, an optimized trajectory for the first coordinating vehicle such that the detected conflict is resolved.

A vehicle coordination system can comprise a plurality of coordinating vehicles, each vehicle (i=1, 2, 3, . . . , N) having a controller. The controller can include a communication terminal configured to receive trajectory messages from each vehicle, of the plurality of coordinating vehicles, in a communication range. The trajectory messages can include vehicle trajectory information for a predetermined update interval. The controller can include a computer processor configured to execute instructions stored on a non-transitory memory. The instructions can include calculating an assumed trajectory by solving an optimal control problem; for each received trajectory message, detecting a conflict with a corresponding vehicle based on the received trajectory information and the calculated assumed trajectory; and when a conflict is detected, adjusting terminal state constraints in the optimal control problem and calculating, with the adjusted constraints in the optimal control problem, an optimized trajectory for the first coordinating vehicle such that the detected conflict is resolved.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete appreciation of the disclosed embodiments and many of the attendant advantages thereof will be readily obtained as the same becomes better understood by reference to the following detailed description when considered in connection with the accompanying drawings, wherein:

FIGS. 4A-4F are position space (y, x) snapshots of a 6 car simulation at varying times, where the black boundary for all cars (coordinating and non-coordinating) represents the avoidance boundaries parameterized by ($\Delta_x$, $\Delta_y$), and the added white boundary around the coordinating cars represents the added margin afforded by move suppression parameters ($\epsilon_x$, $\epsilon_y$), and overlapping white boundaries are conflicts, and boundaries change color to red for one conflict and to yellow for two simultaneous conflicts, in which:

FIG. 4A is a 0 sec snapshot that shows the cars at steady-state, before the car 1 lane change and consequent conflicts;

FIG. 4B is a 3.4 sec snapshot that shows cars 2 and 3 in conflict with each other;

FIG. 4C is a 4.7 sec snapshot that shows cars 1 and 3 are in conflict with car 2, where car 2 has two conflicts, and so has a yellow boundary;

FIG. 4D is a 5 sec snapshot that shows cars 1 and 2 with two conflicts each, and car 3 with one conflict;

FIG. 4E is a 8.7 sec snapshot that shows that the conflict between car 1 and car-1 is no longer active, resulting in a color change for the boundary of car 1, where car 2 still has two conflicts, one with car 1 and one with car 3; and FIG. 4F is an end time (30 sec) snapshot that shows that all conflicts are resolved;

DETAILED DESCRIPTION

I. Introduction

Figure 1:
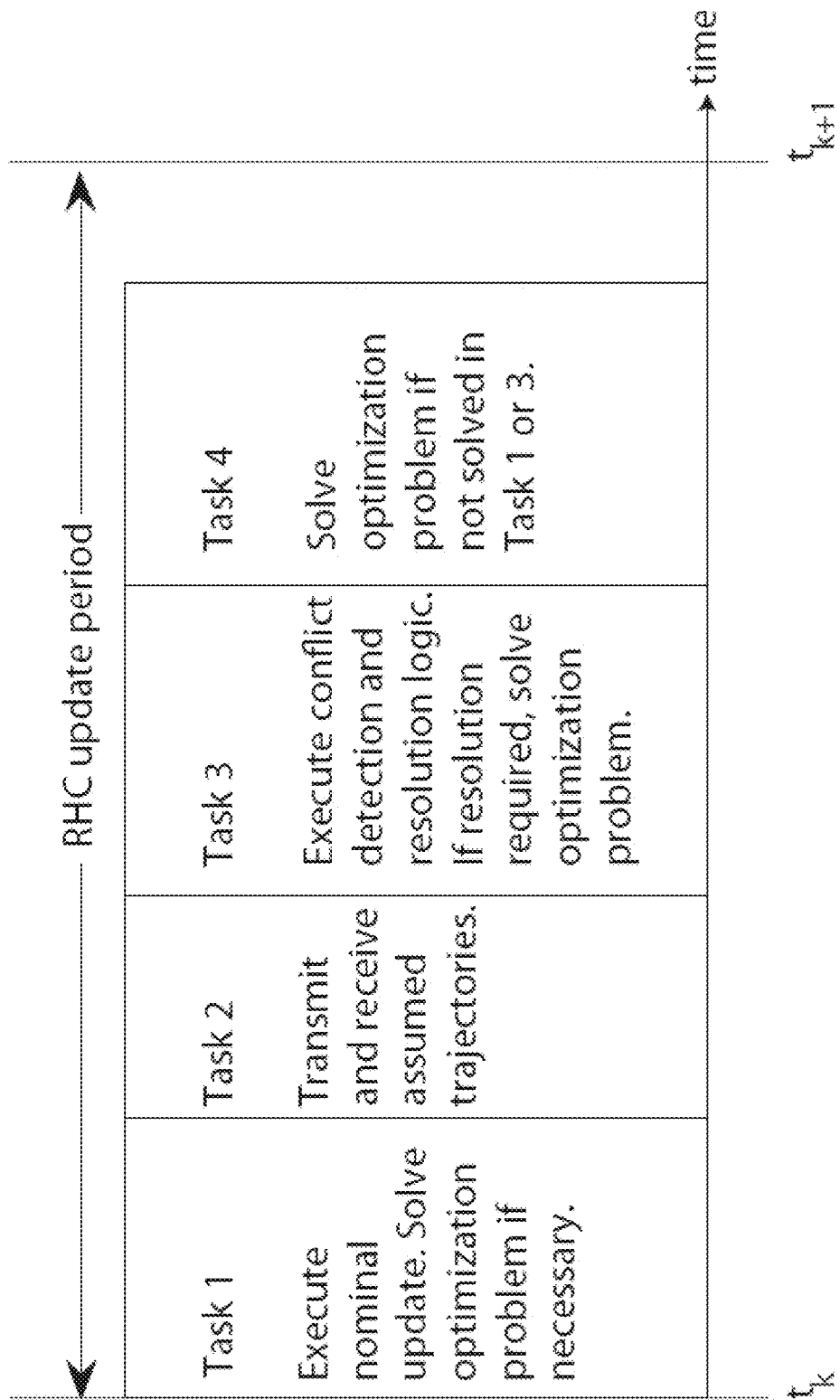
FIG. 1 is a conceptual description of the four tasks executed during each δ-second update period $[t_k, t_{k+1}]$, with update times $t_k$ and $t_{k+1}=t_k+\delta$.

An issue facing the developed world is that much of the infrastructure for transportation will not scale with near-future populations [7], [9]. To bypass the cost of new road infrastructure, there is substantial effort to develop automation-based solutions in which control algorithms perform human tasks to yield greater throughput within existing infrastructure [1], [22]. In the context of freeway driving, such methods incorporate hardware/software and control logic into existing vehicles on freeways already in use. There are many challenges to any approach that automates some aspect of highway driving. The obvious challenge is ensuring vehicles do not collide with each other or roadway barriers. Another challenge is to ensure that adaptation to changing freeway conditions occurs seamlessly and robustly, while maintaining throughput that exceeds that of human driving under (ideally) all conditions.

This disclosure considers the problem of automated freeway driving under the specific scenario of merging. Within this scenario, challenges include the spatial and time constraints associated with merging when cooperative and non-cooperative vehicles are in the merging lane. Related work has proposed and tested cooperative collision warning (CCW) systems that provide situation awareness and warnings to drivers [21]. There are also review papers that consider trends in collision avoidance/warning systems and automation of vehicle control tasks [3], [24]. Adaptive cruise control alone cannot handle time constraints in general, which will be required within one or more layers of logic that automate freeway driving under general conditions, including freeway merging. Thus, there is a need to merge lower-level control with higher-level task management schemes in freeway automation methods.

This disclosure presents an automation method with receding horizon control as the lower-level control method, combined with a higher-level logic for management of lane changing and collision avoidance. A new implementation of distributed receding horizon control is utilized in which each cooperative vehicle is assigned its own optimal control problem, optimizes only for its own control at each update, and transmits and receives information with vehicles in communication range. The local optimal control problems are entirely decoupled; thus, feasibility of each optimization problem does not depend on solutions or even communication with other vehicles. Cooperation is achieved by adjusting constraints and parameters in each optimal control problem, based on a separate higher-level logic that tests for collisions and manages parameter/constraint adjustments when conflicts arise. This approach is in contrast with other receding-horizon approaches where cooperation between subsystems is incorporated directly in the optimal control problem by including explicit coupling terms in the cost function or constraints [5], [10]. Another advantage of the method is that the implemented optimization problem is a quadratic programming problem, which can be solved robustly and efficiently.

As a non-limiting example, this disclosure presents a specific freeway scenario that is a left-lane merger of a car onto a freeway, a common scenario on Japanese freeways. Cars are treated as either "coordinating" or "non-coordinating." By definition, coordinating cars employ the control approach presented herein. Non-coordinating cars are not being regulated, and are viewed as moving obstacles by each coordinating car. To simplify the problem, the short-term future plan of non-coordinating cars is assumed to be predictable without error by each coordinating car. Knowledge of the current state (e.g., position, heading, velocity) of non-coordinating cars is consistent with recent advances by industry and government that advances vehicle-2-vehicle (V2V) technology. Such technology could provide knowledge of non-coordinating cars by each car broadcasting its state information (USDOT, [15]), or by road-side devices that estimate and broadcast the state of such cars (Raytheon, [23]). Thus, it is conceivable that in future intelligent freeways the state of non-coordinating is available, from which a short-term plan could be estimated. In the approach presented here, coordinating cars exchange future plans, and modify them as necessary to ensure collision avoidance and acceptable performance. The term "conflict" refers to when the plan of any car results in a loss of separation, which means that the avoidance boundaries of the two cars intersect, now or at some time within the planning horizon. If loss of separation does not occur, then actual collision cannot occur. Thus, a conflict-free plan is sufficient as a collision-free plan.

The approach presented herein is comprised of the following features: 1) distributed, partially synchronous execution, 2) optimization-based maneuvering and feedback control by receding horizon control, and 3) logic-based conflict avoidance. A high-level overview of each of these three aspects is now given.

Distributed Partially-Synchronous Execution

Each coordinating car must make decisions locally, exchanging plan information with cars ("neighbors") in range of communication. Each update window is synchronized (via a global clock keeping with GPS), while communication exchanges can be asynchronous provided the maximum delay is bounded and less than the update period. Computations (by optimization) are also completely distributed and asynchronous.

Figure 9:
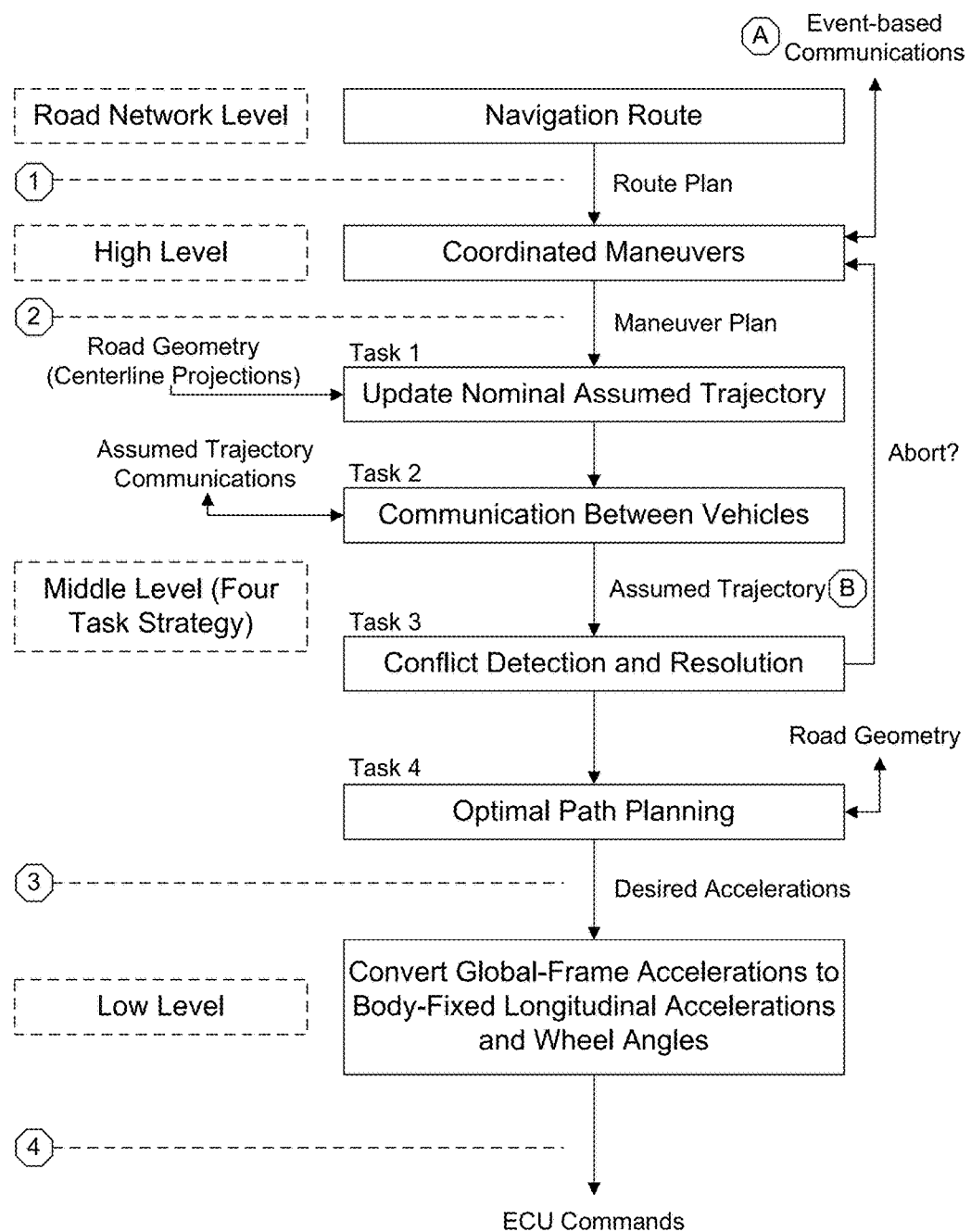
FIG. 9 is a cooperative driving software framework for a coordinating vehicle, where interfaces between different layers of the framework are numbered and described in Table 1, while communication interfaces are lettered.

FIG. 9 illustrates a non-limiting exemplary framework for cooperative driving that integrates event-based group coordination logic, periodic (optimization-based) path planning, digital maps, collision avoidance, and communications. The interfaces between various levels of the framework and external entities are summarized in Table 2. At the core of the framework is a four-task strategy for path planning. Although DRHC based path planning is proposed within this strategy, optimization is not a prerequisite. However, integration through online optimization guarantees constraints are satisfied and maximum (as defined by the cost function) performance is achieved.

Task 2: Exchange (transmit and receive) assumed trajectories with each neighbor.

Task 3: Check assumed trajectories (self against neighbors) for conflicts, and resolve any conflicts as necessary. Conflict "types" determine the resolution assignment, as detailed in this work. Computing a conflict-resolving maneuver involves solving an optimization problem.

Task 4: Solve an optimization problem to generate the next implemented maneuver, if not already done in tasks 1 or 3. This is required when initial maneuvers are simple to compute (i.e., no optimization required in task 1) and such maneuvers do not result in a conflict (no optimization required in task 3).

FIG. 1 shows, at a conceptual level, each of the four tasks sequentially executed during each receding horizon update period. An optimization problem will be solved one or two times during each update period, for each coordinating car. During each update period, the purpose of the four tasks is to provide a conflict-free receding horizon trajectory that will be implemented during the next update period. Assume that all cars have synchronized update times $t_k$, $k \in \mathbb{N}$, but the execution of tasks within each update period need not be synchronized. The timing requirement is that all four tasks are completed within each update period for every car. Only the inter-vehicle communication task 2 requires coordination between vehicles.

The four-task strategy presented here separates the optimization problem from the handling of collision avoidance. Handling collision avoidance constraints directly in the optimization problem generally makes the problem non-convex and/or introduces decision variables ([12], [18]) that, when added to the computed trajectory variable set, can dramatically increase computation time. The solution to such non-convex problems are also locally optimal, which has computational implications (e.g., solutions depend largely on the chosen warm-start solution). To bypass these computational issues, avoidance constraints are not included

TABLE 1

| Interface | Functionality | Example |
| --- | --- | --- |
| 1. Road Network Level in High Level | Route plan to event-based scenarios | I am a cooperative vehicle traveling on the highway and approaching an interchange. I will now listen for vehicles merging from a ramp. |
| 2. High Level to Middle Level | Event-based maneuver plans to (periodic) nominal assumed trajectories | I have negotiated a lane-change to begin in 2.1 secs. I will speed up to 25 m/s at 0.5 m/s/s to meet a gap in the traffic available in 6.2 secs. |
| 3. Middle Level to Low Level | Conflict-free path plans to (body-fixed) throttle, brake, and steering commands | I resolved a conflict with a trajectory from a neighboring vehicle and produced a global longitudinal and lateral acceleration profiles to realize the conflict-free trajectory. |
| 4. Low Level to Physical Actuators | Throttle, brake, and steering commands to CAN messags | I need throttle angle of 10.2 deg. This requires. a PWM Signal of 12.3%. |
| A. Event-based Communications | Messages containing quantities necessary to coordinate the maneuvers of multiple vehicles | I am to cooperative vehicle traveling on the highway. Here are gaps around me in which vehicles can lane change, |
| B. Assumed Trajeciory Commucations | Messages containing (nominal) path planning solutions of other cooperative vehicles | I am a cooperative vehicle. Here are my (global) position, velocity, and acceleration profiles for the next 5 seconds |
| Road Geometry (Digital Map) | Upcoming road geometry to nominal assumed Irajectories updates | Here are GPS waypoints defining the three lanes of upcoming road geometry in the next 300 meters. |
| Abort Maneuver Plan | Conflict defections to negotiated maneuver plans | I have an unforeseen conflict with another vehicle this is unable to be resolved without abandoning our negotiated maneuver plan. |

Referring to FIG. 9, the common order of execution of tasks for each car over the common update period (0.5 seconds here, without loss of generality) includes:

Task 1: Generate a nominal "assumed trajectory" for the next planning horizon, which may involve solving an optimization problem. For cars that are merging into a lane, for example, optimization is used to compute the initial lane-change maneuver.

in the present optimization problem. Instead, task 3 logic tests for conflicts and adjusts parameters in the terminal state constraints in the optimization problem to resolve a detected conflict. This is a distinct advantage the present approach compared to approaches in the literature.

Optimization-Based Maneuvering

Receding horizon control is used to compute the maneuver of each car. In receding horizon control the current control action is determined by solving a finite-horizon optimal control problem within each sampling period [13]. Each optimization yields an open-loop control trajectory and the initial portion of the trajectory is applied to the system until the next sampling instant. In this disclosure, the planned maneuver is short-term (5 seconds) and incorporates the dynamics of the car, smoothness conditions between maneuver updates, a move suppression constraint, and minimizes a cost function. In practice, low-level (inner-loop) controllers may be used to stabilize cars along the computed maneuver. Avoidance constraints (between cars, and between car and road boundary) are not included in the optimization problem, but are incorporated in distributed logic executed by each car in parallel, between optimization updates.

The automotive industry is embracing receding horizon control research for powertrain [19] and vehicle stability [6] applications. Furthermore, this research is being applied to path planning applications for autonomous driving [20] and eco-driving [11]. The convergence of advanced global positioning technologies, prototype V2V communication, and increased onboard computation capabilities has allowed academia and industry to explore the possibilities of cooperative control between cars. Distributed receding horizon control enables cooperative control by enforcing constraints on allowable vehicle motion and sharing predicted paths between vehicles. Global positioning further enables cooperative control through the existence of a common global clock and inertial coordinate frame.

Each coordinating vehicle uses an assumed trajectory (denoted $\hat{M}$), which is computed in task 1. The assumed trajectory is made available to all neighboring cars in task 2, then checked for conflicts using logic in task 3. When conflicts are detected, the logic "types" the conflict, and then resolves the conflict according to its type. Conflict types are distinguished by the position of each vehicle relative to the conflicting vehicle (e.g., behind, ahead, on left and merging right, etc.). The notation $\hat{M}_i$ is used to denote the assumed trajectory specific to car i. The move suppression constraint in the optimization problem is used to ensure that newly optimized trajectories remain within set bounds (termed "move suppression margins") of $\hat{M}$. The logic that ensures $\hat{M}$ is conflict-free incorporates the move suppression margins, to ultimately ensure that implemented maneuvers are conflict free. This is described in greater detail in Section II.

Section II defines the optimal control problem (OCP) solved locally for each car, and includes calculations for parameters in each OCP that are tuned by the four-task execution logic. The OCP is time-discretized and solved numerically by methods detailed in Section III. The four-task logic is presented in Section IV, which includes the method of typing different conflicts that can occur between vehicles. To demonstrate the logic in cooperative freeway merging, a non-limiting example of a six-car merging scenario is presented in Section V, followed by a larger-scale example in Section VI that models a representative merge on the Japanese Tomei Expressway. Section VII discusses hardware controllers and exemplary algorithms. Section VIII discusses conclusions and extensions.

II. Optimal Control Problem for Individual Coordinating Vehicles

Figure 2:
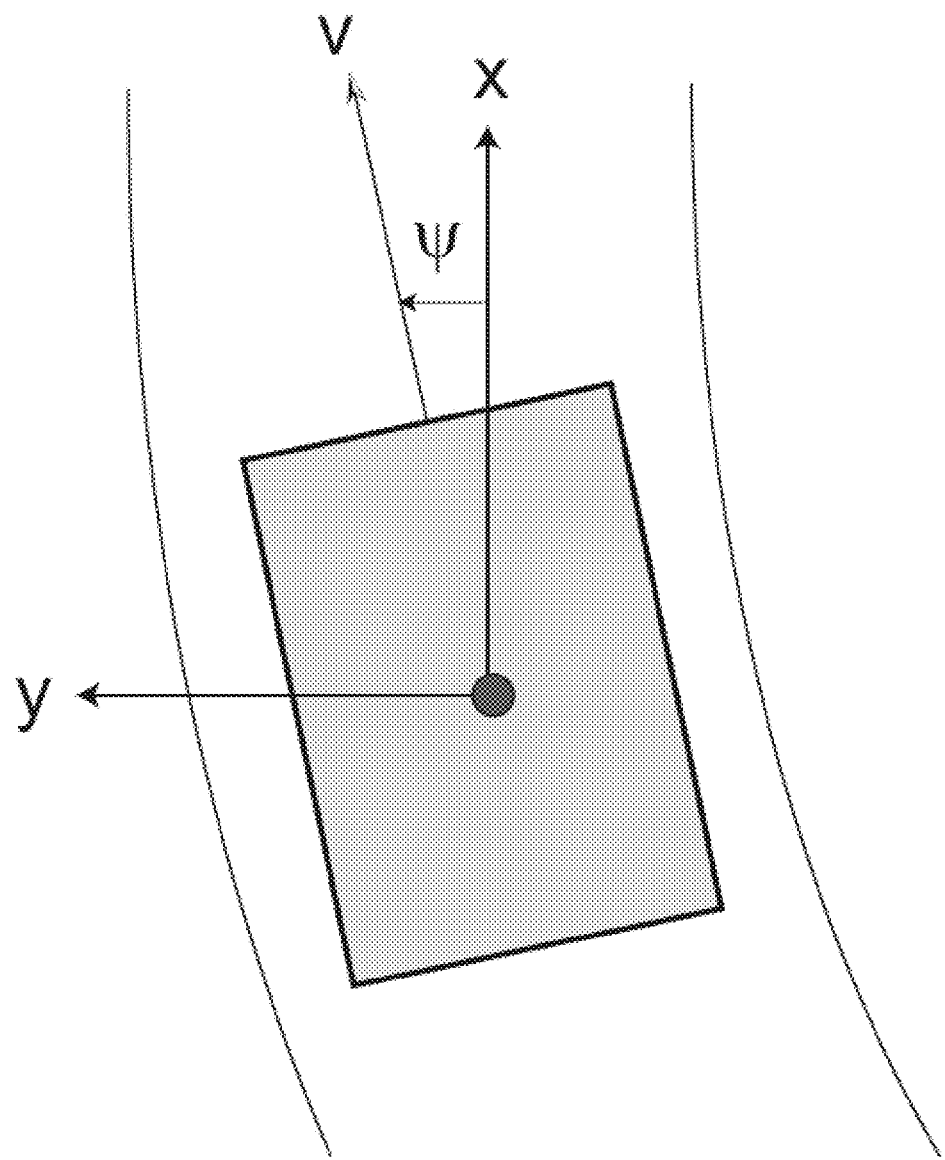
FIG. 2 is a graphical representation of a car at some instant of time with global configuration positions (x, y) and (ψ, v)

This section defines the continuous time 2-dimensional optimal control problem (OCP) for each individual coordinating vehicle. In future sections, the subscript i=1, 2, . . . n, on each variable denotes the coordinating car number. Since the OCP is decoupled for each car, the i-subscript notation is not used in this section. Based on a unicycle model, each car has state variables $(x(t), y(t), \dot{x}(t), \dot{y}(t)) \in \mathbb{R}^4$ and heading/speed control inputs $(\psi(t), v(t)) \in \mathbb{R}^2$ at any time t≥0, with coordinate frame defined in FIG. 2. The continuous time model of the dynamics is:

$$\dot{x} = v \cos(\psi), \dot{y} = v \sin(\psi). \quad (1)$$

The control problem requires constraints on the states and inputs, and a cost penalty is used to smooth the time rate-of-change of the control inputs. Using the concept of differential flatness [16], there is a one-to-one map from the variables (x, $\dot{x}$, $\ddot{x}$, y, $\dot{y}$, $\ddot{y}$) to the variables (x, y, $\psi$, v, $\dot{\psi}$, $\dot{v}$) using these substitutions:

$$v = \sqrt{\dot{x}^2 + \dot{y}^2}, \quad \dot{v} = \frac{\dot{x}\ddot{x} + \dot{y}\ddot{y}}{\sqrt{\dot{x}^2 + \dot{y}^2}}, \quad \psi = \arctan(\dot{y}/\dot{x}), \quad \dot{\psi} = \frac{\dot{x}\ddot{y} - \dot{y}\ddot{x}}{\dot{x}^2 + \dot{y}^2}. \quad (2)$$

Using these substitutions in the OCP, the dynamics are implicitly (and exactly) satisfied, and the dynamic equations (1) need not be included as constraints in the OCP. Since v>0 in the described multi-car scenarios, $\dot{x}$>0 and/or $\dot{y}$>0; thus, there are no singularity problems in computing the substituted variables (2). While the OCP is defined in terms of the (x, $\dot{x}$, $\ddot{x}$, y, $\dot{y}$, $\ddot{y}$) variables, the "assumed trajectories" communicated (in task 2) and tested for conflicts (in task 3) are based on the variables (x, y, $\psi$, v). When conversion to either variable set is required, (2) or its inverse map (which follows trivially from (1) and its time derivative) is used.

Notation used to define the OCP is assembled into Table 2.

TABLE 2

| Variable | Meaning |
|---|---|
| T | Receding horizon planning period (5 sec) |
| δ | Receding horizon update period (0.5 sec) |
| $t_k$ | Receding horizon update time (sec), $t_k = k * δ, k = 0, 1, \ldots$ |
| $x^c(\cdot; t_k) : [t_k, t_k + T] \to \mathbb{R}$ | Trajectory to be optimized (likewise for y and time derivatives) |
| $x^{ref}(\cdot; t_k) : [t_k, t_k + T] \to \mathbb{R}$ | Reference trajectory in the cost function (likewise for y and time derivatives) |
| $x^{des} \in \mathbb{R}$ | Desired end state, $x^c(t_k + p0\ T; t_k) = x^{des}$ (likewise, for y and time derivatives) |
| $\hat{x}(\cdot; t_k) : [t_k, t_k \to T] \to \mathbb{R}$ | Assumed trajectory, version n = 1, 2 (likewise for y, $\psi$, v) |
| $\hat{M}(t_k)$ | The communicated set of assumed trajectories $\{\hat{x}, \hat{y}, \hat{\psi}, \hat{v}\}$. |

Notation x(t) denotes the actual x-position of car at any time t, whereas $x^c(t; t_k)$ is the computed position defined only on the time interval $[t_k, t_k+T]$. By the receding horizon implementation, these trajectories coincide over the update period:

$$x(t) = x^c(t; t_k), t \in [t_k, t_{k+1}]. \quad (3)$$

In reality, of course, inner-loop control makes these trajectories close but not exactly equal. For the planning period $[t_k, t_k+T]$, the OCP has the following data: the initial values $$X_I(t_k) = (x(t_k), \dot{x}(t_k), \ddot{x}(t_k), y(t_k), \dot{y}(t_k), \ddot{y}(t_k)),$$

the desired end values $$X_F(t_k+T) = (x^{des}, \dot{x}^{des}, y^{des}, \dot{y}^{des}),$$

and the reference and assumed trajectories. The continuous time OCP using the flat parameterization is:

$$\min_{(x^c, y^c, \dot{x}^c, \dot{y}^c, \ddot{x}^c, \ddot{y}^c)} \int_{t_k}^{t_k+T} \{ w_x [x^c(s; t_k) - x^{ref}(s; t_k)]^2 + \quad (4)$$
$$w_y [y^c(s; t_k) - y^{ref}(s; t_k)]^2 + w_{xd}[\dot{x}^c(s; t_k) - \dot{x}^{ref}(s; t_k)]^2 +$$
$$w_{xd}[\dot{y}^c(s; t_k) - \dot{y}^{ref}(s; t_k)]^2 w_{xdd}[\ddot{x}^c(s; t_k)]^2 +$$
$$w_{ydd}[\ddot{y}^c(s; t_k)]^2\} ds$$

$$\text{s.t. } \gamma_{ms} G(x^c(t; t_k), y^c(t; t_k), \hat{M}(t_k)) \leq 0 \in \mathbb{R}^2, \quad t \in [t_k, t_k + T] \quad (5)$$

$$(x^c(t_k; t_k), \dot{x}^c(t_k; t_k), \ddot{x}^c(t_k; t_k), y^c(t_k; t_k), \dot{y}^c(t_k; t_k), \ddot{y}^c(t_k; t_k)) = X_I(t_k) \quad (6)$$

$$(x^c(t_k + T; t_k), \dot{x}^c(t_k + T; t_k), y^c(t_k + T; t_k), \dot{y}^c(t_k + T; t_k)) = X_F(t_k + T) \quad (7)$$

The weights are chosen $(w_x, w_y, w_{\dot{x}}, w_{yd}, w_{xdd}, w_{ydd}) > 0$ in (4). Reference trajectories enter only in the cost function (4), and assumed trajectories enter only in the constraints (5). The function G in (5) defines two "move suppression constraints" and $\gamma ms = 1$ if move suppression is active, and 0 if it is not. The move suppression constraints $G = (g1, g2)$ are defined as $$g_1 \triangleq \{x^c(t; t_k) - \hat{x}(t; t_k)\} \cos(\hat{\psi}(t; t_k)) + \{y^c(t; t_k) - \hat{y}(t; t_k)\} \sin(\hat{\psi}(t; t_k)) | - \epsilon_x,$$

$$g_2 \triangleq \{y^c(t; t_k) - \hat{y}(t; t_k)\} \cos(\hat{\psi}(t; t_k)) + \{x^c(t; t_k) - \hat{x}(t; t_k)\} \sin(\hat{\psi}(t; t_k)) | - \epsilon_x,$$

with $\epsilon_x, \epsilon_y > 0$. Activation (on vs. off) of the move suppression constraints is described in the four-task execution logic details in Section IV. The assumed trajectories $\hat{M}(t_k)$ are defined to start and end with the corresponding initial condition and desired values, respectively. Consequently, due to (6)-(7), the computed and assumed trajectories are always equal at the start and the end of each planning horizon.

The purpose of the move suppression constraints (5) is to ensure that the computed maneuver remains within bounds of $\hat{M}$. Separately, logic (defined in Section IV-A) ensures that $\hat{M}$ is conflict free, and incorporates the margin that defines how far computed maneuvers can be from $\hat{M}$ to thus ensure that the maneuver itself is conflict free. To graphically visualize (5), define the deviation variables $(\Delta x, \Delta y, \Delta \psi)$ in a relative frame that is translated by $\hat{x}, \hat{y}$ and rotated by $\hat{\psi}$, such that the assumed car is at the origin:

$$\Delta x \triangleq \{x^c(t; t_k) - \hat{x}(t; t_k)\} \cos(-\hat{\psi}(t; t_k)) - \begin{Bmatrix} y^c(t; t_k) - \\ \hat{y}(t; t_k) \end{Bmatrix} \sin(-\hat{\psi}_i(t; t_k)) \quad (8)$$

$$\Delta y \triangleq \{y^c(t; t_k) - \hat{y}(t; t_k)\} \cos(-\hat{\psi}(t; t_k)) + \begin{Bmatrix} x^c(t; t_k) - \\ \hat{x}(t; t_k) \end{Bmatrix} \sin(-\hat{\psi}(t; t_k))$$

$$\Delta \psi \triangleq \psi^c(t; t_k) - \hat{\psi}(t; t_k)$$

Figure 3:
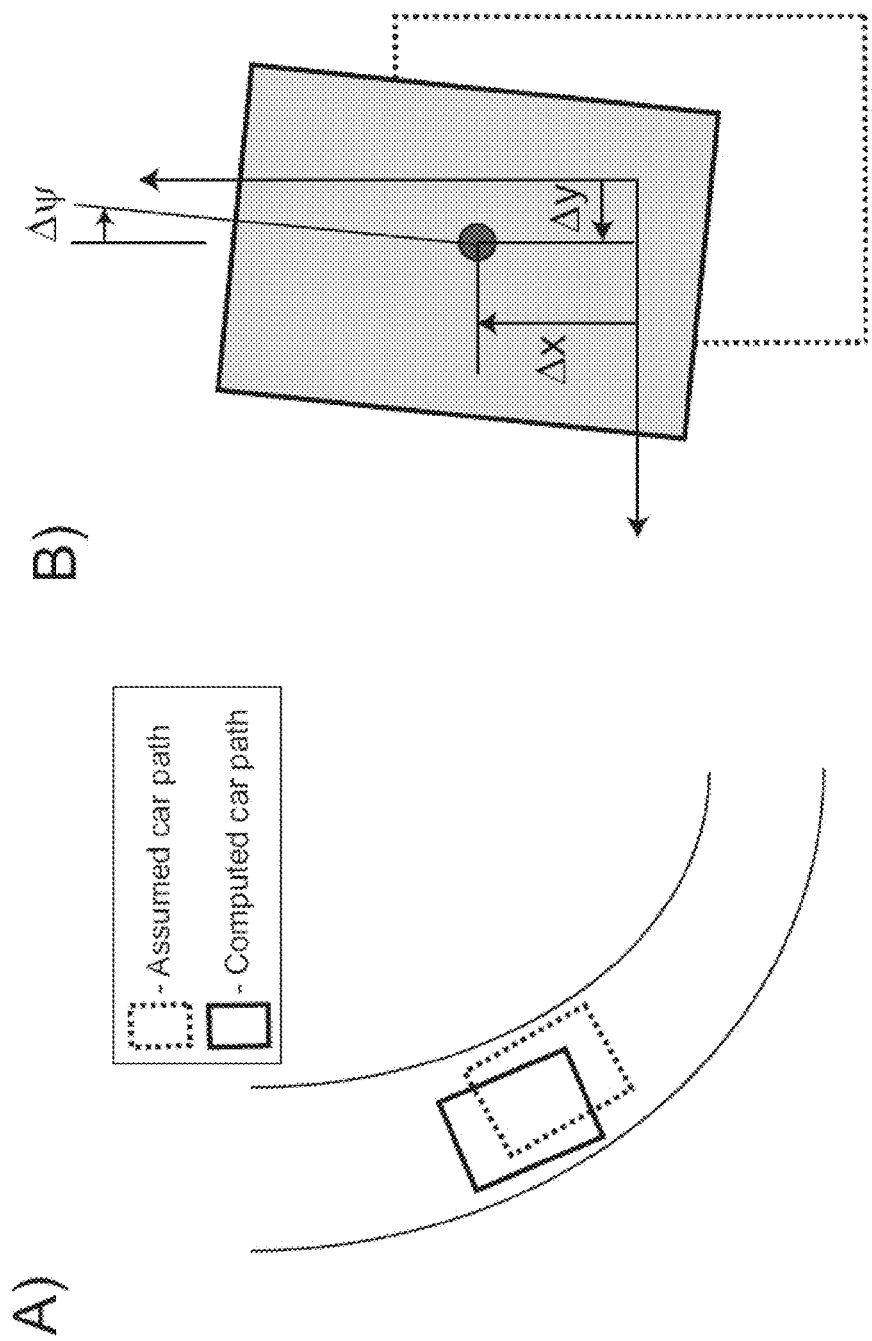
FIG. 3A is a computed (solid outline) and assumed (dashed outline) configuration for a car at some instant of time, in an arbitrary road geometry.
FIG. 3B is a close-up of two vehicle configurations in the relative frame in which the assumed position and heading are zero, where the variables in the figure (Δx, Δy, Δψ) are defined in equation (8)

Then (5) is equivalent to $|\Delta x| \leq \epsilon_x$ and $|\Delta y| \leq \epsilon_y$. In FIG. 3, a car's computed and assumed configurations are shown at some instant in time (FIG. 3A), and a close-up of these configurations in the relative frame (FIG. 3B) shows the deviation variables defined in (8).

Although the move suppression constraints (5) explicitly bound how much $\Delta x, \Delta y$ deviate, the heading deviation $\Delta \psi$ is only implicitly bounded, since a feasible solution to the OCP (in which dynamics and move suppression are satisfied for all time over the planning horizon) limits how big $\Delta_\psi$ can be. Moreover, since the computed and assumed trajectories are always equal at the start and the end of each planning horizon, $\Delta \psi = 0$ at the start and end of each planning horizon also.

When the move suppression constrains (5) are off, the OCP does not require the assumed trajectories $\hat{M}(t_k)$. Constraints (5) are activated except in two cases: 1) The car is computing the nominal assumed trajectory in task 1 that is initiating a change in desired speed or a lane change; or, 2) The car is computing a resolution to a detected conflict in task 3. Observe that (5) are linear constraints in the computed variables $(x^c, y^c)$.

A. Computation of Initial and Desired States

1) Task 1: Before an optimization problem is solved, the initial states $X_I$ and desired end states $X_F$ must be computed. This computation is done during task 1, the nominal update task, using the trajectories computed during the previous update. Changes to $X_F$ are also possible in task 3 if a resolution is required for a coordinating car; details on these changes are provide in Section IV. The initial states are defined simply as $$X_I(t_k) \triangleq (x^c(t_k; t_{k-1}), \dot{x}^c(t_k; t_{k-1}), \ddot{x}^c(t_k; t_{k-1}), y^c(t_k; t_{k-1}), \dot{y}^c(t_k; t_{k-1}), \ddot{y}^c(t_k; t_{k-1})).$$

The 4 desired end states $X_F(t_k + T) = (x^{des}, \dot{x}^{des}, y^{des}, \dot{y}^{des})$ are computed as described next.

Here, and in the remainder of this disclosure, assume the highway is straight with driving in the x-direction ($\psi = 0$ heading). Non-straight roads have been addressed in the present method by projecting the $(x, y, \psi)$-path onto the centerline of the corresponding lane, with the centerline position and heading computed using a road geometry mapping library. Where appropriate, the present disclosure indicates how the straight-road assumption would be generalized to the non-straight road case.

Desired velocities $(\dot{x}^{des}, \dot{y}^{des})$ are computed from $(v^{des}, \psi^{des})$ using (1). The values $(x^{des}, y^{des}, v^{des}, \psi^{des})$ therefore define $X_F(t_k + T)$ at each update. In the straight-road case, $\psi^{des} = 0$ at every update. For the nominal update in task 1, the value for $x^{des}$ is defined by extrapolating $x^c(t_{k-1} + T; t_{k-1})$ by $\delta$ seconds, assuming that speed remains constant at $v^{des}$ over the $\delta$ seconds. Thus, updates to $(y^{des}, v_{des})$ completely define $X_F(t_k + T)$ at each update.

There are a few cases to consider with defining $(y^{des}, v^{des})$ at each task 1 update. If no lane change occurs, then $y^{des}$ is kept at its previous value. If a lane change occurs, then $y^{des}$ is incremented by one lane width. Simulations in the present disclosure involve a lane change only for a merging car, though in-lane cars could also change lanes in general during task 1 (nominal update) or task 3 (as part of a resolution). Also, nominal updates in $v^{des}$ are possible in task 1. For simplicity in this disclosure, $v^{des}$ is set equal to the previous value set during the update period (i.e., no nominal changes to $v^{des}$ in task 1). Thus, if no conflict resolutions are required for a car, $v^{des}$ will remain the same indefinitely.

2) Task 3: Conflict resolutions in task 3 necessarily adjust $v^{des}$, altering the value set at the nominal update (task 1). When resolving a conflict, $x^{des}$ is defined to be set distance behind the car in front in most cases. The only exception is when the lane merger is first introduced as a task 1 nominal update to $y^{des}$. If the optimization problem solved in task 1 for an initial lane merger results in a conflict behind a car already in the lane, an alternative optimization problem is solved that replaces the equality constraint on $x^c(t_k + T; t_k)$ with an inequality constraint, as detailed in Section IV.

B. Reference Trajectories

The assumed trajectories $\hat{M}_1(t_k)$ are defined in the four-task execution logic details in Section IV. If move suppression is on ($\gamma_{ms}$=1), the reference trajectories are initialized using the assumed trajectories as $$x^{ref}(s;t_k)=\hat{x}(s;t_k), y^{ref}(s;t_k)=\hat{y}(s;t_k) \quad (9)$$

$$\dot{x}^{ref}(s;t_k)=\hat{v}(s;t_k)\cos[\hat{\psi}(s;t_k)], \dot{y}^{ref}(s;t_k)=\hat{v}(s;t_k)\sin[\hat{\psi}(s;t_k)] \quad (10)$$

For non-straight road geometries, the reference trajectories are next modified by projecting the initial trajectories onto the road's centerline path (available from a mapping library), keeping the speed profile the same as before. The projection modification has the effect of removing steady-state errors that can accumulate if no projection was used (data not shown). For proprietary reasons, details regarding the projection method are not provided here. Since the simulations shown in Section V are for lane-merging on a straight road, no projection is needed.

If move suppression is off ($\gamma_{ms}$=0), the reference trajectories are computed assuming a straight-line path from initial to final values with constant heading and acceleration or deceleration. Though this choice of reference trajectories may not be dynamically feasible in general, they influence the cost function only, and the optimized trajectories are always dynamically feasible.

III. Numerical Methods

This section shows how the OCP is time-discretized and numerically solved. A key feature of the OCP defined in the previous section is that the discretized problem is a quadratic-programming (QP) problem, which can be solved using a QP-solver. With positive weights on each term in the cost function, the present QP-problem has a unique global minimizer as its solution. In a non-limiting example, Matlab's solver quadprog.m (with the active-set algorithm) is used to solve the QP problem. Before reviewing the methods, a nomenclature table (Table 3) is provided to defined relevant variables.

TABLE 3

| Variable | Definition |
|---|---|
| $\Gamma(k)$ | B-spline coefficients that parameterize the discretized and optimized trajectories for update $t_k$. |
| $\zeta(k) \in \mathbb{R}^{n_b}$ | Breakpoint time discretization vector defined as $\zeta(k) = [\zeta_1, \zeta_2, \ldots, \zeta_{nd}]$, with $\zeta_1 = t_k$ and $\zeta_{nd} = t_k + T$. $n_b$ is the number of breakpoints, with $n_b - 1$ polynomial pieces. |
| $\tau(k) \in \mathbb{R}^{n_e}$ | Time discretization for constraint enforcement and cost evaluation $\tau(k) = [\tau_1, \tau_2, \ldots, \tau_{ne}]$, with $\tau_1 = t_k$ and $\tau_{ne} = t_k + T$. $n_e$ is the number of enforcement points, with $n_e \geq 2n_b$. |
| $\Xi(k)$ | Discretized and optimized trajectories (termed "flat outputs") defined at breakpoints $\zeta(k)$ for update $t_k$ (initial guess is $\Xi_0(k)$). |
| k | Spline order (e.g., $a_2 t^2 + a_1 t + a_0$ is order 3, with 3 coefficients) |
| r | Repetition number (multiplicity) of each breakpoint. |
| m | Smoothness of spline at breakpoints (m = k - r). Spline is $C^{m-1}$. |
| $n_c$ | Number of coefficients per output $n_c = (n_b - 1)(k - m) + m = (n_b - 1)r + m$. |

In the spline parameterization, each $\zeta_1$ defines the breakpoint in time where two polynomial pieces are joined in the trajectory, and $n_b$ is the number of breakpoints. In the present formulation, the breakpoint and enforcement time point vectors are linearly spaced between the start and end times of each RH planning period. The discretized optimal control problem is parameterized using B-spline polynomials. One can setup the problem to solve for the B-spline coefficients $\Gamma_i(k)$ as done in [14], [16]. Alternatively, one can setup the problem to solve directly for the trajectories defined at the B-spline breakpoints $\Xi_i(k)$, as done in [20]. The latter is more efficient (7 times faster in based on observations), with equal accuracy, and so these results are presented here.

There are $n_b$=6 breakpoints in ($\zeta_1, \ldots, \zeta_{nb}$) the present implementation, which means there are five polynomial pieces (intervals) over the [0, 5] sec period, and one breakpoint every 1 second. The variables (x, y) are parameterized $k^{th}$-order B-spline polynomials. In Matlab, we set k=6 with interior breaks having multiplicity r=3. As a result, the polynomial pieces are $C^{k-r-1}=C^2$ (i.e., m=3 smoothness conditions are satisfied) at the interior breakpoints, and therefore $C^2$ over the [0, T] interval. The number of coefficients for each B-spline (for x and y) is equal to n, $n_c=(n_b-1)(k-m)+m=18$. There are $n_e$=51 enforcement points ($\tau_1, \ldots, \sigma_{ne}$) where the cost function and constraints get evaluated and enforced, respectively.

The collocation matrix $C_{cm}$ is defined in Matlab using the spcol function. The matrix $C_{cm}$ has dimensions $3n_e \times n_c$, and is a tall matrix. Algebraically, the $x^c$ trajectory and its derivatives satisfy $$x(\tau(k)) \triangleq \begin{bmatrix} x^c(\tau_1; t_k) \\ \dot{x}^c(\tau_1; t_k) \\ \ddot{x}^c(\tau_1; t_k) \\ x^c(\tau_2; t_k) \\ \vdots \\ \ddot{x}^c(\tau_{n_c}; t_k) \end{bmatrix} = C_{cm}\Gamma^x(k) \in \mathbb{R}^{3n_e}, \text{ and } \Gamma^x(k) = C_{cm}^1 x(\tau(k)) \in \mathbb{R}^{n_c},$$

where $C_{cm}^{\perp}$ is the pseudo-inverse of $C_{cm}$. Coefficient vector F is defined likewise by $C_{cm}$, with y ($\tau(k)$)=$C_{cm}\Gamma^y(k)$. The $2n_c$=36 coefficients are denoted $\Gamma=(\Gamma^x,\Gamma^y)$. The vectors x ($\tau(k)$) and y ($\tau(k)$) are the flat outputs at the enforcement points. Denote the (smaller) vectors of flat outputs at the breakpoints as $$\Xi^x(k) \triangleq \begin{bmatrix} x^c(\zeta_1; t_k) \\ \dot{x}^c(\zeta_1; t_k) \\ \ddot{x}^c(\zeta_1; t_k) \\ x^c(\zeta_2; t_k) \\ \vdots \\ \ddot{x}^c(\zeta_{n_b}; t_k) \end{bmatrix},$$

with $\Xi^y(k)$ denoting the comparable vector for y. The $2(3n_b$=36) outputs are denoted $\Xi=(\Xi^x, \Xi^y)$. The collocation matrix $C_{xm}$ is defined to relate $\Xi$ and $\Gamma$, as $$\Xi^x(k)=C_{xm}\Gamma^x(k), \text{ and } \Gamma^x(k)=C_{xm}^{-1}\Xi_i^x(k). \quad (11)$$

The collocation matrix $C_{xm}$ has dimensions $3n_b \times n_c$=18× 18, and is by design a square and invertible matrix [20]. The $\Xi(k)$ variables are the free variables to be optimized. Note that this is the same number of free variables to be solved for as when solving for the B-spline coefficients $\Gamma$. By accessing the B-spline coefficients in (11), the values of the flat outputs can be accessed at the enforcement points. This is necessary for the move suppression constraints (5), and the cost function (4), and is achieved by the relation $$x(\tau(k))=C_{cm}C_{xm}^{-1}\Xi_i^x(k) \text{ and } y(\tau(k))=C_{cm}C_{xm}^{-1}\Xi_i^y(k). \quad (12)$$

The initial and final constraints occur at breakpoints, and so no collocation matrix is needed to access the states (this is not the case when the problem is parameterized in terms of $\Gamma$ instead of $\Xi$. For example, the initial condition constraint on $x^c(\tau_i; \tau_k)$ is posed in terms of the flat outputs as $$[1\ 0\ \ldots\ 0]\Xi^x(k) = x(t_k)$$

Algebraic manipulation results in a flat output-parameterized QP problem:

$$\min_{\Xi} (\Xi - \Xi^{ref})^T Q(\Xi - \Xi^{ref}) \tag{13}$$

$$\text{s.t.}\ A_{eq}\Xi = b_{eq} \tag{14}$$

$$A_{ineq}\Xi \leq b_{ineq} \tag{15}$$

The 10 linear equality constraints (14) in the present OCP are (6) and (7) (and define $A_{eq}$ and $b_{eq}$), and the $4n_e$ linear inequality constraints are (5) (and define $A_{ineq}$ and $b_{ineq}$). In the cost function, $\Xi^{ref}$ parameterizes the reference values as defined by the cost function (4) and in Section II-B. Given the discretized reference trajectories $x^{ref}(\tau(k))$, the vector $\Xi^{x,ref}$ is computed as $\Xi^{x,ref} = C_{xm} C_{cm}^{-1}(\tau(k))$, for example. The integrated cost (4) is discretized and becomes a summation, evaluating the terms at the enforcement points. This means Q incorporates the matrix multiplications in (12).

A numerical solution of the discretized OCP requires an initial guess, denoted $\Xi_0$. Nominal trajectories (corresponding to the assumed trajectories $\hat{M}$) are used to generate the initial guess. Denoting the x nominal trajectories at update time $t_k$ as $x_0(\tau(k))$, the $\Xi_0^x(k)$ is simply a sampled version of $x_0(\tau(k))$ if breakpoints coincide with enforcement points, and a simple interpolation can be used if breakpoints do not coincide with enforcement points. The assumed trajectories $\hat{M}(t_k)$ are also discretized, defined at $\tau(k)$, and can be computed from $\Xi$ using (12) and converting to the variables $(x, y, \psi, v)$ using (2).

IV. Four-Task Logic

Details about each task in the execution logic are now provided. During update period $[t_k, t_{k+1}]$, solving an optimization problem for the future interval $[t_{k+1}, t_{k+1}+T]$ results in a solution $\Xi_i(k+1)$ for vehicle i that can be implemented over the next update period. For the update period $[t_k, t_{k+1}]$, the tasks have the following sequential steps:

1) Task 1—Nominal Updates.
   a) Compute the initial states $X(t_{k+1})$ and desired states $X(t_{k+1}+T)$ (see Section II-A).
   b) Test if the desired states include a lane change.
      i) If the desired states do not include a lane change, keep the move suppression flag ON (i.e., $\gamma_{ms}=1$), and define the assumed trajectories $\hat{M}(t_{k+1})$ as the remainder of the trajectories computed during the previous update, extended by $\delta$ seconds to end at the desired states. In the case of y, for example, this is $$\hat{y}(t; t_{k+1}) = \begin{cases} y^c(t; t_k), & t \in [t_{k+1}, t_k + T], \\ y^{des}, & t \in (t_k + T, t_{k+1} + T] \end{cases} \tag{16}$$

ii) If the desired states do include a lane change, turn the move suppression flag OFF (i.e., $\gamma_{ms}=0$), and use optimization to compute $\Xi_i(k+1)$. The assumed trajectories $\hat{M}(t_{k+1})$ are computed from $\Xi_i(k+1)$, 2) Task 2—Communication. Once task 1 is complete, each coordinating car broadcasts ($t_{k+1}$), and receives $\hat{M}_j(t_{k+1})$ for each can j in a prescribed range.

3) Task 3—Conflict Detection and Resolution.
   a) For each neighboring car j, check for a conflict. A conflict is detected if the assumed trajectories, which have rectangular safety margins around them, overlap at any time in the interval $[t_{k+1}, t_{k+1}+T]$. The function checkConflict.m used for conflict checks is provided in Appendix A. Cars are checked in serial order, sorted by car number.
      i) If no conflict is detected, proceed to checking the next neighboring car.
      ii) If conflict is detected, compute conflict type=1, 11, 21, 22, 23, 24 or 3 (each defined in Section IV-A) and store in a conflict log. If the conflict type (1 or 21 or 22) warrants a resolution, turn the move suppression flag OFF (i.e., $\gamma_{ms}=0$), then compute and store the change in desired states $X(t_{k+1}+T)$ that will provide a resolution. Proceed to checking next neighboring car. NOTE: turning the move suppression flag OFF is only done once.
   b) Once all neighboring cars are checked for conflicts, if any resolutions are required, use optimization to compute $\Xi_i(k+1)$ for the "most critical" conflict, defined as the conflict that results in greatest loss of separation between the two cars. If a type 22 conflict occurs, the optimization problem is modified, as detailed in Section IV-A.

4) Task 4: If move suppression flag is still on ($\gamma_{ms}=1$), solve the optimization problem. This is the case only if optimization was not used in the nominal update (task 1) or to resolve a conflict (task 3).

Details regarding how conflicts are typed, how desired states $X(t_{k+1}+T)$ are updated to provide a resolution for specific conflicts, and how prior and ongoing conflicts are logged and logically handled, are provided in the coming sections.

A. Details on Task 3 Conflict Detection and Resolution

If a conflict is detected and a resolution for i is required, then $x_i^{des}$ and $v_i^{des}$ can change, or $v_i^{des}$ alone changes. The conflict detection and resolution logic is designed to run deterministically and generate the same results in every car locally, so that no further communications are required to achieve conflict resolutions. A conflict between cars i and j is detected using the checkConflict.m function provided in Appendix A. The rectangular shape associated with each car's avoidance boundary has width equal to $c_W + \gamma \epsilon_y + 2\Delta_y$ and length $c_L + \gamma \epsilon_x + 2\Delta_x$, where ($c_W, c_L$) are the car width and length dimensions, $\gamma=1$ when one car is non-coordinating and $\gamma=2$ when both are coordinating. The larger $\gamma$ for both cars coordinating is due to the increased position flexibility permitted by the move suppression constraints. The parameters ($\Delta_x, \Delta_y$) define nominal avoidance boundaries. The logic in checkConflict.m (Appendix A) takes the global position and heading of a pair of cars, and checks if their rectangular shapes overlap. Since the rectangles can have arbitrary relative heading, this function is already applicable to non-straight road geometries.

The checkConflict.m function is called within a for-loop and evaluated sequentially at each breakpoint $\{\tau_1, \tau_2, \ldots, \tau_{nb}\}$. If a conflict is detected, the first breakpoint that registers a conflict defines the "first loss-of-separation time," and the breakpoint that corresponds to the largest loss of separation during the planning horizon defines the "maximum loss-of-separation time." The logic then proceeds with typing the conflict, as detailed below. There are three main categories in enumerating pair-wise (i and j) conflict types for car i:

1) When a front/rear conflict arises in the same lane, satisfying $$|\hat{y}_i(t;t_{k+1}) - \hat{y}_j(t;t_{k+1})| \leq \eta, \forall t \in [t_{k+1}, t_{k+1}+T], \quad (17)$$

($\eta$ is a proprietary value) there are two types:

Type 1: If $\hat{x}_i(t_{k+1}; t_{k+1}) < \hat{x}_j(t_{k+1}; t_{k+1})$, signaling that car i is behind car j. In this case, car i logs the conflict and a resolution based on the adaptive $v^{des}$ update rule (alternative update rules have been tested, and are possible):

$$v_i^{des} = v_j^{des} + \beta\{\hat{v}_j(t_{k+1}; t_{k+1}) - \hat{v}_i(t_{k+1}; t_{k+1})\} + \alpha \min_t g_y(t, i, j), \quad (18)$$

where $$g_y(t,i,j) = |\hat{y}_i(t;t_{k+1}) - \hat{y}_j(t;t_{k+1})| - (c_W + \gamma \epsilon_y + 2\Delta y).$$

The desired position behind the car is $$x_i^{des} = \hat{x}_j(t_{k+1}+T;t_{k+1}) - [c_L + \gamma \epsilon_x + 2\Delta_x], \quad (19)$$

using $\gamma=2$ if car j is coordinating, $\gamma=1$ if non-coordinating. While this adaptation may initially resolve the conflict, the conflict can re-occur later, since the adaptation is attempting to space the cars optimally, i.e., such that there is no wasted space and the boundaries of desired separation are tangent to one another.

Type 11: If car i is ahead of car j, car i only logs the conflict, but does not change $v^{des}$. In this case, the conflict must be resolved by car j.

This front/rear conflict is typically resolved by the next update period. Nonetheless, type 1 and 11 conflicts are kept in the log and (18)-(19) is indefinitely implemented for the following car, unless the leading car changes lanes or a new conflict arises (e.g., a car merges between car i and car j, as considered in the simulations).

2) If a conflict does not satisfy (17) for all $t \in [t_{k+1}, t_{k+1}+T]$, but does satisfy (17) at $t=t_{k+1}+T$, (that is, the cars start in different lanes but end in conflict in the same lane) there are four possibilities (labeled type 2x, with x=1,2,3 or 4):

Type 21: Car i is in the lane approaching a merging car j too closely from behind. As with type 1, the (18)-(19) adaptation is stored in the log as the resolution.

Type 22: Car i is merging into a lane and approaching an in-lane car j too closely from behind. The resolution must change the merging maneuver to not run into car j from behind. This is the only conflict type that utilizes an alternative optimization problem to compute resolution. Constraint parameter updates (18)-(19) are used, but the equality constraint on $x^c(t_k+T; t_k)$ is changed from $x^c(t_k+T; t_k) = x_i^{des}$ to $x^c(t_k+T; t_k) \leq x_i^{des}$. When this conflict occurs, it is by definition the "most critical" conflict for the merging car. The modified optimization problem is solved at the end of task 3 in this case.

Type 23: Car i is in the lane and ahead of merging car j. There is no resolution stored in the log, and car j is responsible for resolving this conflict.

Type 24: Car i is merging ahead of in-lane car j, which is approaching car i too closely from behind. As with type 23, there is no resolution stored in the log, and car j is responsible for resolving this conflict.

3) If a conflict does not fit any of the above criteria, it is given Type 3—this includes all unclassified conflicts. Future work will explore detection and classification of other conflicts.

In the merging scenario considered in the next section, type 3 conflicts are never encountered, while all other conflict types (six: 1, 11, 21, 22, 23, 24) do occur. Type 3 conflicts have been observed in non-straight road situations.

V. Simulation of a Six-Car Merging Scenario

In the six-car scenario, four coordinating cars (numbered 1, 2, 3, 4) interact with two non-coordinating cars (numbered -1, -2). The initial conditions, and corresponding lane, for each car at the start of the simulation is shown in Table 4 below.

TABLE 4

| Car No. | Initial Condition (x(0), y(0), ψ(0), v(0)) | Lane (Merging, Left, Right) |
| --- | --- | --- |
| 1 (coord) | (−95, 1.75, 0, 25) | Merging |
| 2 (coord) | (−110, −1.75, 0, 25) | Left |
| 3 (coord) | (−140, −1.75, 0, 27) | Left |
| 4 (coord) | (−170, −1.75, 0, 27) | Left |
| −1 (non-coord) | (−80, −1.75, 0, 25) | Left |
| −2 (non-coord) | (−50, −5.25, 0, 20) | Right |

Non-coordinating cars travel at constant speed without changing lanes. The objective is for Car 1 to merge into the left freeway lane, and Cars 1-4 to avoid conflicts with each other and with non-coordinating cars. Challenging initial conditions were chosen to cause a chain of conflicts within the left-hand lane. An extended version of the logic permits coordinating cars to change lanes to avoid conflicts while maintaining a desired speed, under specific circumstances. The purpose of the non-coordinating Car-2 is, essentially, to block this from happening, so that left-lane coordinating cars are forced to slow down to avoid conflicts. The details of this extended logic are not provided here.

Figure 4:
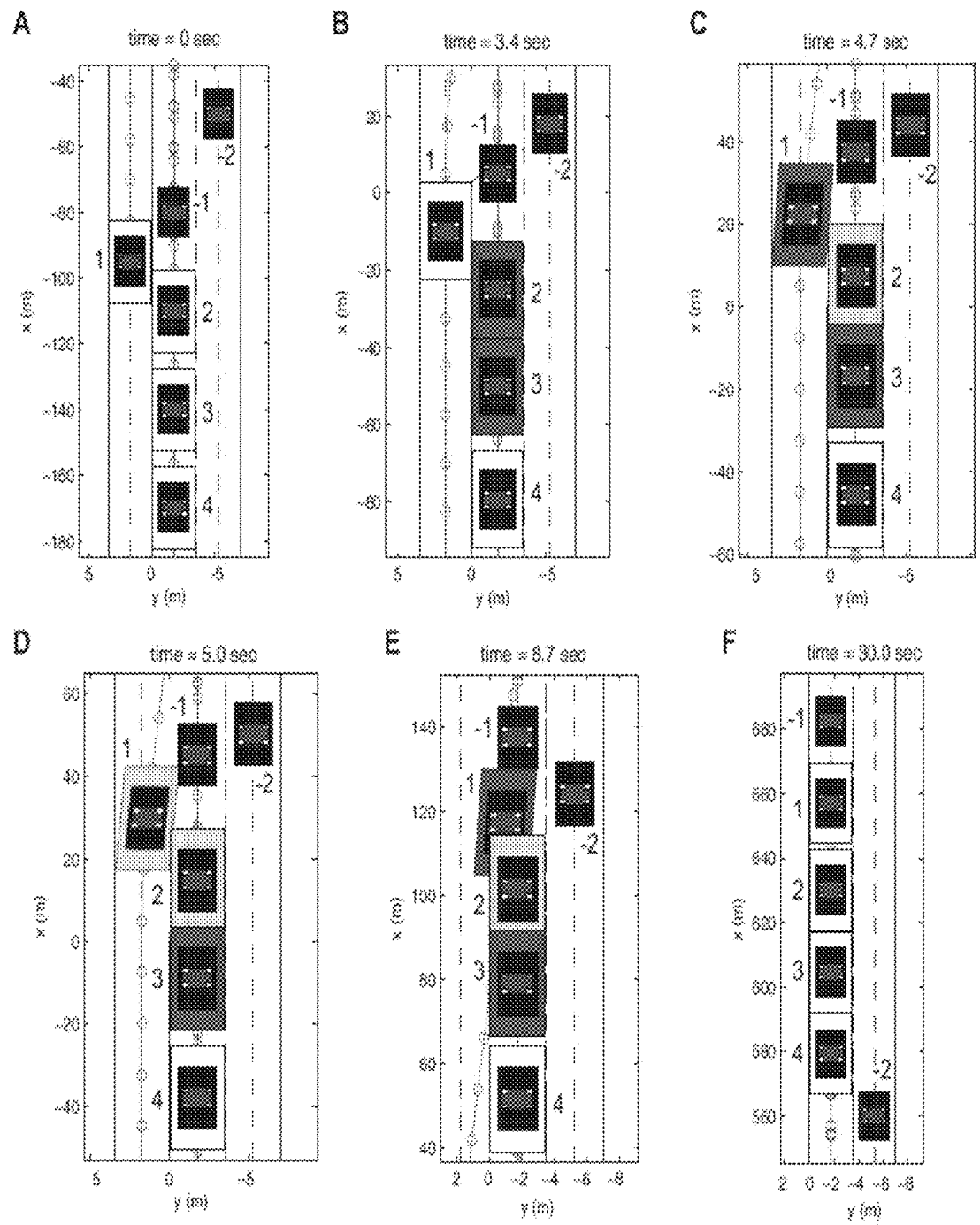

The positions of the six cars at initial time $t_0=0$ are shown in FIG. 4A. The cars are represented by blue rectangles. The black boundary surrounding each car represents the avoidance boundary parameterized by ($\Delta_x$, $\Delta_y$), and the added white boundary around coordinating Cars 1-4 represents the added margin afforded by move suppression parameters ($\epsilon_x$, $\epsilon_y$). The positions are shown at time 3.4 sec in FIG. 4B. Observe the color change in the boundaries of coordinating Cars 2 and 3. This was done to signal a conflict at that time. The conflict occurs because Car 3 is going 2.0 m/sec faster behind Car 2. The four-task logic detects and resolves conflicts that may occur at any time during the 5-second planning horizon; thus, conflicts can be resolved with no visible color change, since only the first 0.5 sec of each 5 sec window are implemented. Conflicts that do include the implemented portion of the RH planning period will cause the boundary color change. The color red is used to signal a conflict with one car, and the color yellow signals a conflict with two cars simultaneously.

Figure 5:
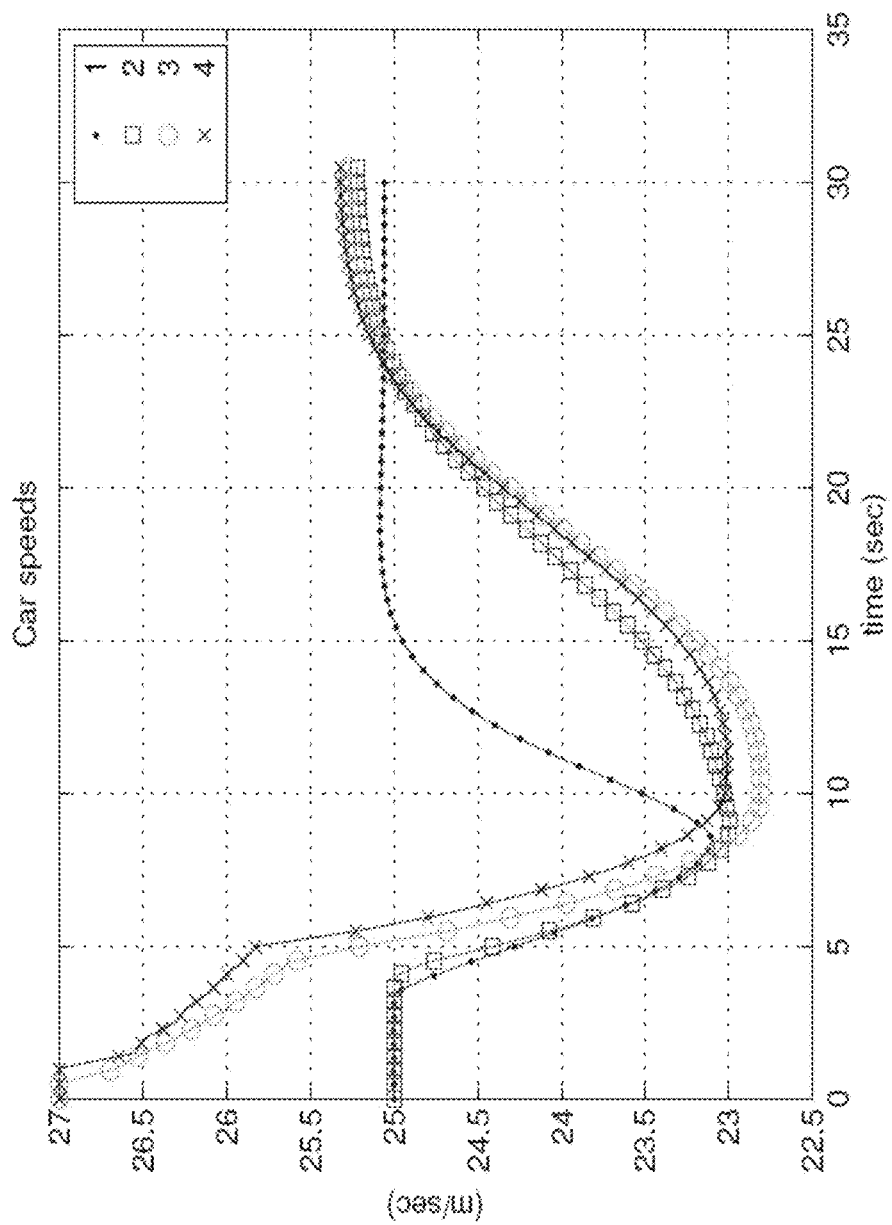
FIG. 5 is a graphical plot of speed $v_t$ for each of four coordinating cars with respect to time t, where Cars 3 and 4 slow initially due to the conflicts with cars 2 and 3, respectively, and the more dramatic chain of speed reductions follows the merging of car 1 behind car-1, with speed reductions required to create enough space to resolve all in-lane conflicts.

The position of the six cars at time 47 sec is shown in FIG. 4C. The lane merging by Car 1 is now progressing. At this time, there is a detected conflict between Car 1 and non-coordinating Car-1, although it is not yet observable by any color change. This is because the conflict happens 1.2 seconds into the RH planning period, i.e., after the RH update period duration, but before the end of the RH planning period for Car 1. The conflict between Cars 1 and 2 happens from the start of the planning period, and so is visible from the boundary color change. Due to the conflict between Car 1 and non-coordinating Car-1, Car 1 is slowing down while changing lanes, making use of an alternative optimization defined in task 3. In fact, Car 1 continues to slow down until time t 8 seconds to resolve the conflict with Car-1. The time history of the speeds $v_i$ for all coordinating cars is shown in FIG. 5.

The position of the six cars at time 5 sec is shown in FIG. 4D. This is the first time that the conflict between Cars 1 and -1 occurs within the RH update period, and so results in the color change in the boundary of Car 1. The position of the six cars at time 8.7 sec is shown in FIG. 4E. Although conflicts exist at this time, the black boundaries do not (and will not) overlap. At time t=18.5 seconds, there are no conflicts present between any cars. FIG. 4F shows the cars at the end time of the simulation, with no conflicts present. Use of (18)-(19) can cause eventual re-activation of type 1-type 11 conflicts, though this does not occur within the simulation time shown. For the remainder of this section, the progress of the four-task logic execution during the simulated merging scenario is highlighted at specific RH update periods.

During RHC iteration 1 (0.0 to 0.5 sec), an in-lane conflict between Cars 2 and 3 is first detected (type 11 for Car 2, and type 1 for Car 3). Car 3 implements the adaptive update rule (18), and at RHC iteration 2, the conflict is gone. When the difference in speed between cars in this conflict scenario is larger, the conflict can persist for more than one update period before going away. In this case, Cars 2 and 3 have only a 2 m/s speed difference, and start far enough apart initially to prevent an egregious conflict.

During RHC iteration 2 (0.5 to 1.0 sec), Car 3 has an ongoing type 1 conflict with Car 2, though the conflict is no longer active. Car 2 removes the type 11 conflict from the log, since it is no longer active, while Car 3 keeps the type 1 conflict in the log, and continues to implement the adaptive $v^{des}$ update rule (18). Car 3 also has a new type 11 conflict with Car 4, and Car 4 performs a resolution to slow down behind Car 3. By RHC iteration 3, since by (18) Car 3 is attempting to maintain the minimum safe separation distance, the conflict with Car 2 is re-activated. Since Car 2 removed the prior type 11 conflict with Car 3, it is treated as a new type 11 active conflict. Since Car 3 kept the conflict in the log, it is treated as a pre-existing type 1 conflict with Car 2 that is reactivated. Alternative methods of conflict log management are possible, of course.

Initially, Cars 3 and 4 have the same speed. When Car 3 slows down to resolve the conflict with Car 2, it creates a conflict with Car 4 at the next RHC iteration. As with the Car 2-Car 3 conflict, the Car 3-Car 4 conflict requires Car 4 to slow down. By the next RHC iteration, this conflict is gone, and Car 3 removes the conflict (type 11) from its log, while Car 4 keeps the conflict (type 1) to continue to implement (18).

During RHC iteration 8 (3.5 to 4.0 sec), Car 1 computes a nominal lane-changing maneuver, and two new conflicts arise: A type 24 conflict with Car 2 (which requires Car 2 to resolve, and it does), and a type 22 conflict with non-coordinating Car-1. Resolving task 22 requires Car 1 to merge while slowing down behind Car-1, for which an alternative optimization problem is run. The problem is like the OCP, except there are no move-suppression constraints, and $x(t_k+T)$ is bounded in inequality constraints, instead of being set equal to $x^{des}$ in an equality constraint. The need for Car 1 to merge while slowing down behind Car-1 persists until RHC iteration 18, at which time the resolved conflict is removed from the log.

During RHC iteration 31 (15.0 to 15.5 sec), Car 1 has an ongoing conflict of type 24 with Car 2, which was initially detected at time 4. At this time of detection, this conflict was type 21 for Car 2, since Car 2 was approaching merging Car 1 too closely from behind, in the left lane. At time 12, the type 21 conflict for Car 2 was converted to type 1 since is satisfied the condition (17). Also, at time 12, the type 24 conflict for Car 1 was converted to type 11. Type 11, 23 and 24 conflicts are removed from a log if the conflict becomes in-active at any RH update.

During the final RHC iteration 60 (29.5 to 30.0 sec), Cars 1-4 show no active conflicts, while Cars 2-4 have ongoing resolution of the type 1 conflicts with the cars ahead of them. The adaptive update rule (18) for $v^{des}$ is being implemented in all three cases. Note that the rule can result in the conflict becoming transiently active again, if the inter-vehicle distance shrinks below the desired separation of $c_L+\gamma\epsilon_x+2\Delta_x$. In any case, the vehicles are observed to converge to the common separation distance and speed 25 m/s.

The total computation time to serially compute the four-task logic for each of the 4 cars, for all 60 receding horizon updates, was 8.44 seconds. Dividing the total time by the number of cars and update periods, the four-task execution runtime per vehicle and per update period was ~35 milli-seconds for this simulation example. The simulations were run on a Sony VAIO laptop (Intel Core Duo CPU, T7500 at 2.2 GHz, with 2 GB RAM). The demonstrated speed of the logic and optimization-based control calculations suggests that implementations on real vehicles, with dedicated hardware, is certainly feasible. Additionally, most of update period can be dedicated to transmitting and receiving data (Task 2 of FIG. 1) in real implementations. More than 90% of the 0.5 sec would available for Task 2 in the simulation example.

VI. Realistic Large-Scale Simulation

This section details the incorporation of the partially-synchronous four-task strategy into a larger-scale merging scenario. This scenario models a representative merge on the Japanese Tomei Expressway, which runs between Tokyo and Nagoya. The scenario has one short (90 m) merging zone with a single merge lane and two highway lanes, which are termed cruising (i.e. slow lane) and passing (i.e. fast lane) (see FIG. 6).

In addition to the optimization-based maneuvering and logic-based conflict avoidance of the four-task strategy, this simulation expands the cooperation between vehicles to include discrete negotiation between vehicles to align merging vehicles with gaps in the highway flow. The negotiation between vehicles leverages communication to proactively reduce the number and severity of conflicts that would subsequently require resolution if vehicles only reacted to the assumed trajectories, $\hat{M}$, of neighboring vehicles at the time of the merging lane change. The negotiation between vehicles aligns arrival times, speeds, and relative positions at the point of the merging lane change. The negotiation logic realizes this alignment by modifying the end points of the nominal trajectories, $x_0$, given in task 1 of the optimization-based maneuver planning.

Besides the negotiation logic, the simulations also utilize the road geometry mapping library mentioned earlier to update nominal and compute reference trajectories such that the vehicles follow the geometry of the Japanese highway. Furthermore, each vehicle's computed trajectory, $\chi^c$, which is in a global coordinate frame, is converted to the body-fixed control inputs of longitudinal acceleration and steering wheel angle, which induces a yaw rate.

Different flow rates (see Table 5) and inter-vehicle communication (i.e., V2V) penetration percentages (0%, 5%, 10%, 20%, 50%, 75%, 100%) are used in the large-scale simulations. The combinations of light flow rates (e.g., 450 veh/hr implies 1 veh/8 s arrival rate) and heavy flow rates (e.g., 1800 veh/hr implies 1 veh/2 s arrival rates) were used to challenge the negotiation and four-task logic.

TABLE 5

| | Traffic Flow Pattern | | | |
|---|---|---|---|---|
| | 1 | 2 | 3 | 4 |
| Merging Lane | 900 veh/hr | 450 veh/hr | 900 veh/hr | 900 veh/hr |
| Cruising Lane | 900 veh/hr | 450 veh/hr | 1350 veh/hr | 1800 veh/hr |
| Passing Lane | 1800 veh/hr | 1800 veh/hr | 1350 veh/hr | 900 veh/hr |

Figure 6:
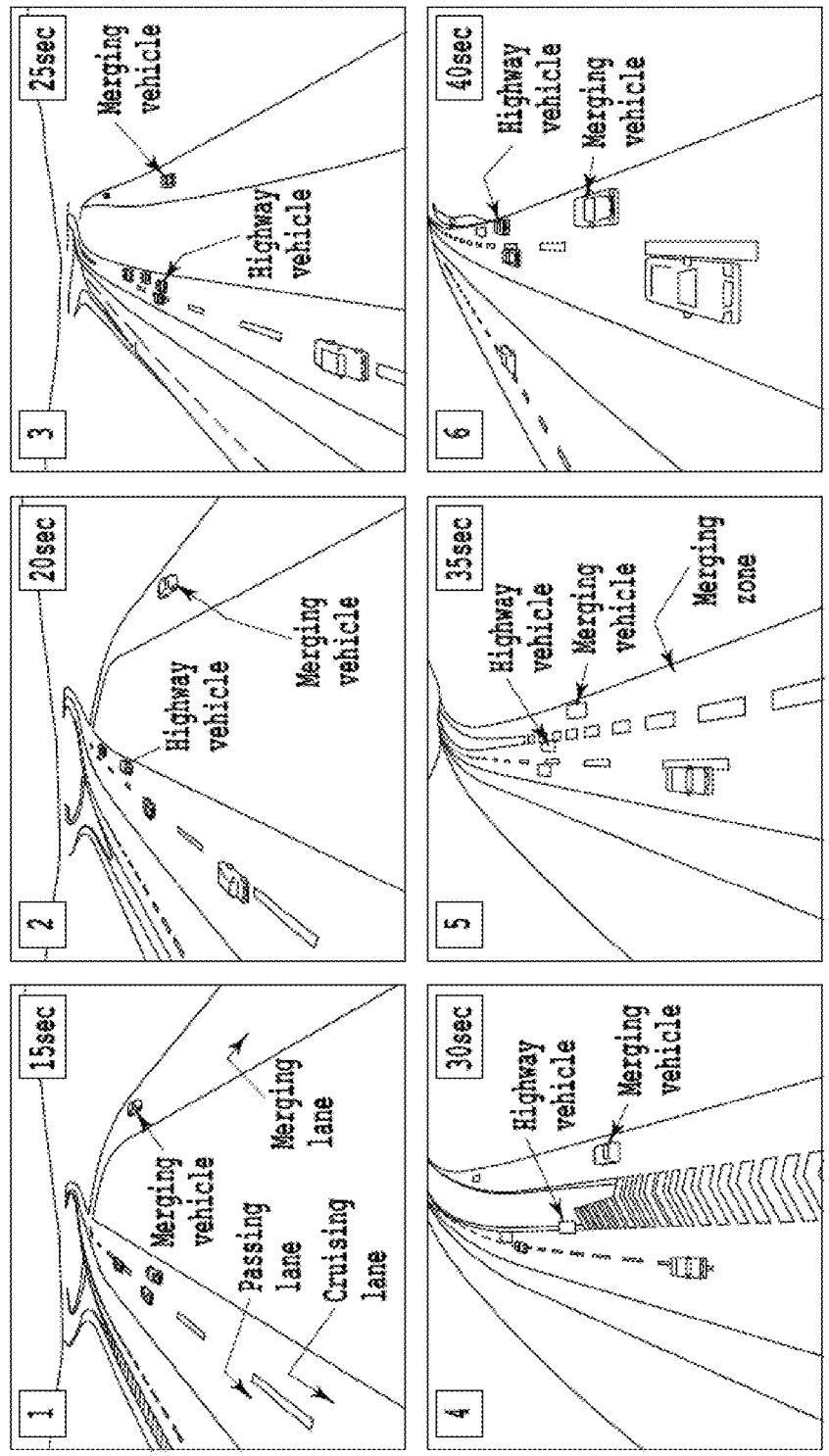
FIG. 6 is a series of five-second snapshots of a merging scenario on the Tomei Expressway in Japan.

FIG. 6 shows snapshots of a particular merging vehicle that negotiates a gap in front of a highway vehicle. The figure shows the three lane types (passing, cruising and merging) and the merging zone during the simulation.

The following are some qualitative observations from these simulations.
   A slight (3%) increase in the average arrival speed of merging vehicles was observed for those that incorporated a negotiated gap in the highway flow.
   Significant traffic flow improvement requires greater than 50% V2V penetration.
   With sufficient V2V penetration, the negotiation allows for better load balancing on the highway lanes leaving the merge zone.
   Negotiation harmonizes and slightly (3-5%, depending on V2V penetration percentage) increases the average speeds through the merge zone.

To clarify the significance of these large-scale simulations, it should be noted that the heavy flow rates do not cause any loss of liveness to the simulation and that each cooperative vehicle executes the four-task logic within every 0.5 second update period of simulation time. Moreover, the optimization-based maneuver planning is performed by vehicles regardless of their position on the road and their surrounding vehicles. The method's generality allows the vehicles to path plan under all scenarios, such as car-following, lane-changing, and open road. In the case of merging, some vehicles will modify their nominal trajectories to assist or complete a highway merge, but the generality of the methods means that all cooperative vehicles continually perform the four-task logic, and thereby ensure conflict-free driving anywhere along the roadway.

VII. Discussion of Hardware Controllers

Figure 7:
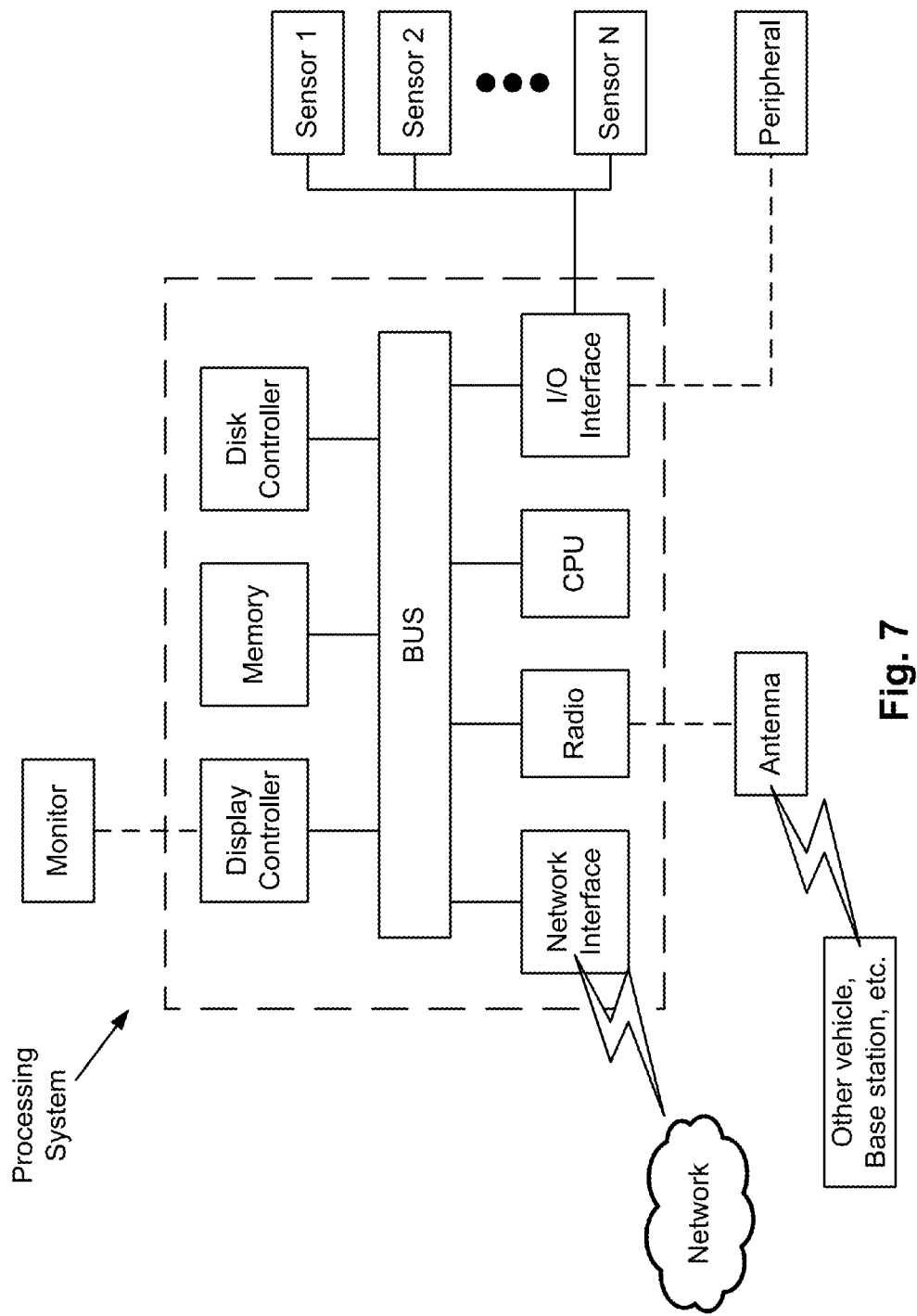
FIG. 7 is a schematic of a processing system according to embodiments of this disclosure.

FIG. 7 schematically illustrates a processing system in accordance with this disclosure. Such a processing system is provided in each vehicle of a platoon. However, it is should be appreciated that an identical processing system in each vehicle is not necessary. Yet, providing each vehicle with the processing system allows the vehicles to process in parallel in accordance with this disclosure.

The processing system can be implemented using a microprocessor or its equivalent, such as a central processing unit (CPU) or at least one application specific processor ASP (not shown). The microprocessor utilizes a computer readable storage medium, such as a memory (e.g., ROM, EPROM, EEPROM, flash memory, static memory, DRAM, SDRAM, and their equivalents), configured to control the microprocessor to perform and/or control the processes and systems of this disclosure, including executed all or part of the equations and algorithms described herein in serial or parallel. Other storage mediums can be controlled via a controller, such as a disk controller, which can controls a hard disk drive or optical disk drive.

The microprocessor or aspects thereof, in an alternate embodiment, can include or exclusively include a logic device for augmenting or fully implementing the algorithms and processes presented in this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU.

In another aspect, results of processing in accordance with this disclosure can be displayed via a display controller to a monitor (e.g., allowing a driver to perceive a status of cooperative vehicle control or to confirm commands from a lead vehicle). The display controller would then preferably include at least one graphic processing unit for improved computational efficiency. Additionally, an I/O (input/output) interface is provided for inputting sensor data from Sensors 1, 2 . . . N, which collect data relating to vehicle positioning (either, own or other vehicle positioning).

Further, as to other input devices, the same can be connected to the I/O interface as a peripheral. For example, a keyboard or a pointing device (not shown) for controlling parameters of the various processes and algorithms of this disclosure can be connected to the I/O interface to provide additional functionality and configuration options, or control display characteristics. Moreover, the monitor can be provided with a touch-sensitive interface to a command/instruction interface.

The above-noted components can be coupled to a network, as shown in FIG. 7, such as the Internet or a local intranet, via a network interface for the transmission or reception of data, including controllable parameters. The network can also be a vehicle-centric network such as a vehicle local area network. In such an implementation, vehicle path prediction can be routed by packets to automated vehicle equipment to control steering, throttle and braking for purposes of cooperative vehicle control and collision avoidance via the vehicle local area network. That is, the control path for the cooperative vehicle can be executed by transmitting appropriate commands and instructions to the automated vehicle equipment. Other implementations include safety warnings and driver assistance. Also, a central BUS is provided to connect the above hardware components together and provides at least one path for digital communication there between.

A coordinating vehicle can also be connected to other coordinating vehicles via the network, either via the Internet or a proprietary private network. Also, vehicle communications can also be performed by radio communications which do not rely specifically on an Internet-based network. Such communications can rely on GSM, CDMA or LTE-based communications, and can involve relaying via a base station or other intermediary device. Otherwise, communication can be performed directly by various methods capable of transferring data between devices.

As shown in FIG. 7, a coordinating vehicle may also detect the presence of a non-coordinating vehicle via peripheral sensors, such as radar transceivers. In a non-limiting example, the sensors are configured to determine relative location and actual speed information of surrounding non-coordinating vehicles within a detection range. Based on the determined location and speed information, the processor is configured to calculate trajectory information corresponding to each detected non-coordinating vehicle. Accordingly, conflicts with non-coordinating vehicles are detected and resolved by the processing system based on the trajectory information and the above-described logic and the following exemplary algorithm, with the exception of communication between coordinating and non-coordinating vehicles.

Figure 8:
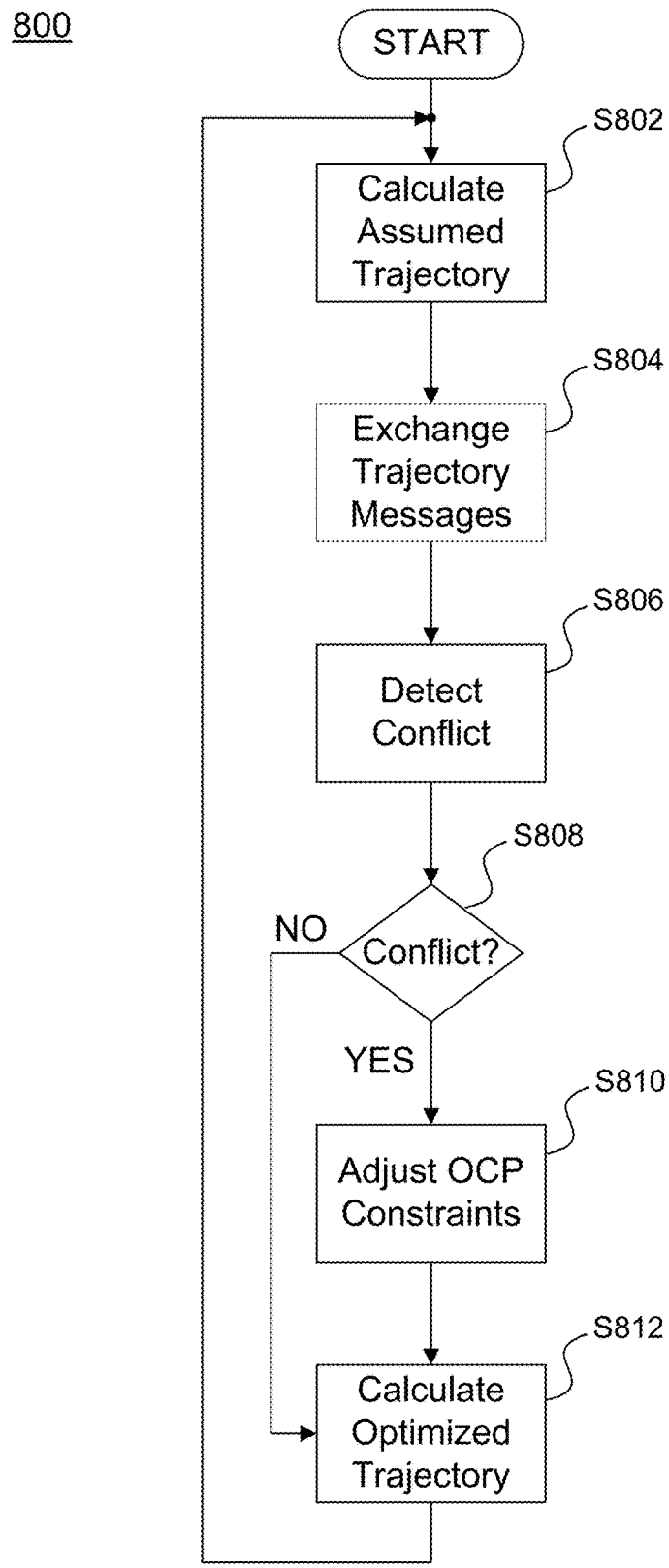
FIG. 8 is a flowchart of algorithms implementing aspects of this disclosure.

FIG. 8 shows an algorithm 800 implementing one embodiment of this disclosure in accordance with the four-task logic discussed above, which involves the processing of at least one processing system, such as that shown in FIG. 7. FIG. 8 involves steps which may be performed by a single controller or by a plurality of controllers operating in parallel or in a partially sequential manner, in accordance with the descriptions provided above.

Referring to exemplary algorithm 800, a first coordinating vehicle which includes the above-described processing system first calculates an assumed trajectory (S802). Next, the first coordinating vehicle exchanges trajectory messages with other coordinating vehicles which are within a communication range (S804). Based on the calculated assumed trajectory and the received trajectory messages, the first coordinating vehicle determines if a conflict between coordinating vehicles will occur (S806). If a conflict is detected (S808), the terminal constraints of the first coordinating vehicle's optimal control problem (OCP) are adjusted (S810) and an optimized trajectory is calculated such that the conflict is resolved (S812). If no conflict is detected at step S808, the first coordinating vehicle will calculate an optimized trajectory without adjusting the optimal control problem terminal constraints. The processing system can be configured such that processing, such as in exemplary algorithm 800, occurs recursively over subsequent update intervals.

Any processes, descriptions or blocks in flow charts or functional block diagrams should be understood as representing modules, segments, portions of code which include one or more executable instructions for implementing specific logical functions or steps in the processes/algorithms described herein, and alternate implementations are included within the scope of the exemplary embodiments of this disclosure in which functions may be executed out of order from that shown or discussed, including substantially concurrently or in reverse order, depending upon the functionality involved.

Moreover, as will be recognized by a person skilled in the art with access to the teachings of this disclosure, several combinations and modifications of the aspects of this disclosure can be envisaged without leaving the scope of this disclosure. Thus, numerous modifications and variations of this disclosure are possible in light of the above teachings, and it is therefore to be understood that within the scope of the appended claims, this disclosure may be practiced otherwise than as specifically described herein.

VIII. Conclusions And Extensions

This disclosure considers the problem of automated freeway merging. The method presented to address this problem incorporates receding horizon control as a lower-level control method, combined with a higher-level logic for management of lane changing and collision avoidance objectives. The method is distributed with partially-synchronous execution, and relies on the high-level logic (rather than the optimization algorithm) to solve conflicts as they arise. It is thus applicable to traffic flows of arbitrary size, including under realistic conditions. The local optimization problems are also entirely decoupled; thus, feasibility of each problem does not depend on the performance of other vehicles. Additionally, the optimization problem when discretized becomes a quadratic programming problem, for which global minimizers can be computed in real-time with great efficiency [25]. The method was demonstrated in detail in a 6-car simulation, and more coarsely (showing trends) in larger-scale simulations that reflect realistic merging scenarios on Japanese freeways.

In the present disclosure, cars are either "coordinating" or "non-coordinating," with coordinating cars running the method derived and non-coordinating cars proceeding with predictable dynamics. Thus, the results shown rely on the assumption that the short-term future plan of non-coordinating cars is predictable without error by each coordinating car. With advances in vehicle-2-vehicle (V2V) technology, real-time knowledge of the state of non-coordinating cars is a realistic assumption, but consideration of uncertainty in the state and the predicted short-term plan for such cars must be addressed for implementations.

At present, communication between cars is assumed to be lossless. Prior to implementation, communication failures between cars must also be considered. RHC has the advantage of having a look ahead policy, so that communication loss can be handled in principle by continuing to use the most recently received policy. In the context of this project, policies are the assumed trajectories. An obvious issue is that, if communication is lost and this is unknown to the transmitting car, that car may continue with modifying its assumed trajectory (by resolving a conflict with a different car, say), and implement a resolution that is not conflict-free with the car that lost communication. Most worst-case scenarios may or may not be possible, depending on the worst-case communication failures. Failures that last over multiple update periods, for example, are essentially impossible to resolve in general. If failures are limited to single update periods, contingencies can be developed to deal with communication loss. For example, the lost-car can be given priority in its maneuver selection, if the loss is unknown to that car. An easier case is when cars are aware of the loss, in which case contingencies that are mutual to both parties can be developed.

The four-task strategy presented here separates the optimization problem from the handling of collision avoidance. This is a distinct advantage compared to approaches in the literature that include collision avoidance constraints directly in the optimization problem, which increases the computation time drastically.

APPENDIX

A. Conflict Checking Function in Matlab

The following Matlab function checkConflict.m was created based on the logic in [2]. Given $(x_1, y_1, \psi_1)$ and $(x_2, y_2, \psi_2)$ for two rectangles (presumed coordinating cars here), the function returns a 1 if there is overlap (a conflict) and 0 otherwise. The coordinate frame here is consistent with the configuration shown in FIG. 2: x-positive vertical and up, y-positive horizontal and left, with yr-positive counter-clockwise and zero along the positive x-axis.

Start function:
function flag=checkConflict (x1, y1, psi1, x2, y2, psi2, PARAMS)
Within the PARAMS structure, the following parameters are defined: carW (car width); carL (car length); xdev, ydev (move suppression margins $\epsilon_x$, $\epsilon_y$); and xmargin, ymargin (conflict avoidance margins $\Delta_x$, $\Delta_y$, defined in Section IV-A).

Next, create rectangle structures, with variables that are assigned the coordinates, angles and dimensions of the cars:
a1=carL/2+xmargin+xdev;  b1=carW/2+ymargin+ydev;
a2=a1; b2=b1;
rect1=[ ]; rect2=[ ];
rect1.S=[a1; b1]; rect2.S=[a2; b2]; % half-boundary dimensions
rect1.center=[x1; y1]; rect1.angle=psi1;
rect2.center=[x2; y2]; rect2.angle=psi2;
Shift rect2 (associated with car 2) to the origin:
rect2.center=rect2.center−rect1.center;
Rotate plane (i.e., rotate the vector to translated rect 2) to make rect2 x-axis aligned
ang=rect2.angle;
W=[cos(ang) sin(ang); −sin(ang) cos(ang)];
rect2.center=W*rect2.center;
Compute extreme vertices of translated, axis-aligned rect2
BL=rect2.center−rect2.S; % bottom-left
TR=rect2.center+rect2.S; % top-right
Calculate vertices of rotated rect1
sin a=sin(rect1.angle−rect2.angle);
cos a=cos(rect1.angle−rect2.angle);
W=[cos a−sin a; sin a cos a];
A=W*rect1.S;  B=W*[−rect1.S(1); rect1.S(2)];  t=sin a*cos a;
Verify that A is vertical min/max, B is horizontal min/max

```
if t < 0
    Ap = B; B = A; A = Ap;
end
```

Verify that B is horizontal minimum (leftest-vertex) of rotated rect 1 (and therefore has a negative x-value)
if sin a<0, B=−B; end
If (rotated rect 1 not in horizontal range of (translated/axis-aligned) rect 2, then collision is impossible.

```
if (B(1) < TR(1) || B(1) > −BL(1))
    flag = 0; return
end
```

If rotated r1 axis aligned, vertical min/max are easy to get.

```
if t == 0
    ext1 = A(2); ext2 = −ext1;
else
    x = BL(1)−A(1); a = TR(1)−A(1); ext1 = A(2);
```

% If the first vertical min/max isn't in (BL.x, TR.x), then find the vertical min/max on BL.x or on

```
TR.x
if a*x > 0
dx = A(1);
if x < 0
    dx = dx − B(1);
    ext1 = ext1 − B(2);
    x = a;
```

```
else
    dx = dx + B(1);
    ext1 = ext1 + B(2);
end
ext1 = ext1*x/dc + A(2);
end
x = BL(1)+A(1); a = TR(1)+A(1); ext2 = −A(2);
```

% if second vertical min/max isn't in (BL.x,Tr.x), then find vertical min/max on BL.x or on TR.x

```
if a*x > 0, dx = −A(1);
if x > 0
    dx = dx − B(1); ext2 = ext2 − B(2); x = a;
else
    dx = dx + B(1); ext2 = ext2 + B(2);
end
ext2 = ext2*x/dx − A(2);
end
end
```

Check for collision

```
if (ext1 < BL(2) && ext2 < BL (2)) || (ext1 > TR(2) && ext2 > TR(2))
    flag = 0;
else
    flag = 1;
end
```

The function is simply adapted to the case when car 2 is non-coordinating by reducing the size of a2 and b2 by xdev and ydev (the move-suppression margins), respectively.

The invention claimed is:

1. A method for controlling a first coordinating vehicle, the method comprising:
receiving trajectory messages from a plurality of second coordinating vehicles in a communication range, the trajectory messages including vehicle trajectory information for a predetermined update interval;
calculating an assumed trajectory for the first coordinating vehicle by solving an optimal control problem, the optimal control problem not including an avoidance constraint;
detecting a conflict based on the received trajectory information and the calculated assumed trajectory; and
when a conflict is detected, adjusting terminal state constraints in the optimal control problem and calculating, with the adjusted constraints in the optimal control problem, an optimized trajectory for the first coordinating vehicle such that the detected conflict is resolved,
wherein the optimal control problem includes cost terms including a move suppression (MS) term indicating an amount that the optimized trajectory may deviate from the assumed trajectory.

2. A controller for a first coordinating vehicle, the controller comprising:
a communication terminal configured to receive trajectory messages from a plurality of second coordinating vehicles in a communication range, the trajectory messages including vehicle trajectory information for a predetermined update interval; and
a computer processor configured to execute instructions stored on a non-transitory memory, the instructions including calculating an assumed trajectory for the first coordinating vehicle by solving an optimal control problem, the optimal control problem not including an avoidance constraint, detecting a conflict based on the received trajectory information and the calculated assumed trajectory, and when a conflict is detected, adjusting terminal state constraints in the optimal control problem and calculating, with the adjusted constraints in the optimal control problem, an optimized trajectory for the first coordinating vehicle such that the detected conflict is resolved, wherein the optimal control problem includes cost terms including a move suppression (MS) term indicating an amount that the optimized trajectory may deviate from the assumed trajectory.

3. The controller according to claim 2, wherein the conflict is detected by determining, based on the received trajectory information and the calculated assumed trajectory, whether a first avoidance boundary of the first coordinating vehicle and a second avoidance boundary of any one of the second coordinating vehicles intersect during the update interval.

4. The controller according to claim 2, wherein:
the terminal state constraints include a velocity term and a vehicle spacing term; and
when a conflict is detected, the processor adjusts the velocity term and/or the vehicle spacing term in the optimal control problem such that the detected conflict is resolved.

5. The controller according to claim 2, wherein during each of successive update intervals, the computer processor is further configured to:
recursively detect conflicts between the first coordinating vehicle and each of the second coordinating vehicles that will occur during the update interval; and
calculate the optimized trajectory for each of the recursively detected conflicts.

6. The controller according to claim 2, wherein the computer processor is further configured to:
classify the detected conflict based on a predetermined rule set; and
adjust the terminal state constraints based on the detected conflict classification.

7. The controller according to claim 2, wherein the assumed trajectory for the first coordinating vehicle is calculated by solving the optimization control problem with terminal constraints modified by a high-level maneuver plan.

8. The controller according to claim 2, further comprising:
a sensor configured to detect a position and speed information for a non-coordinating vehicle within a predetermined detection range, wherein
the processor determines trajectory information for the non-coordinating vehicle based on the detected position and speed information, and
the processor detects a conflict between the first coordinating vehicle and the non-coordinating vehicle based on the determined trajectory information and the assumed trajectory.

9. The controller according to claim 5, wherein during each of the successive update intervals, the communication terminal is further configured to:
transmit the optimized trajectory to the second coordinating vehicles; and receive updated trajectory messages from the second coordinating vehicles.

10. The controller according to claim 5, wherein the assumed trajectory for the first coordinating vehicle in a current update interval is initially set to the calculated optimized trajectory from an immediately preceding update interval.

11. The controller according to claim 5, wherein the assumed trajectory for the first coordinating vehicle in a current update interval is initially set, in the absence of a high-level maneuver plan, by extrapolating the optimized trajectory from an immediately preceding update interval.

12. The controller according to claim 5, wherein the processor is further configured to, during each of the successive update intervals, calculate the optimized trajectory for the detected conflict with an earliest loss-of-separation that requires action by the first coordinating vehicle.

13. The controller according to claim 6, wherein the conflict classification is based on a position of the first coordinating vehicle relative to a conflicting vehicle, of the second coordinating vehicles, which is determined to be in conflict with the first coordinating vehicle.

14. The controller according to claim 2, wherein when a conflict is detected, the MS term is set such that the amount from which the optimized trajectory may deviate from the assumed trajectory is increased.

15. The controller according to claim 8, wherein the processor sets a third avoidance boundary for the non-coordinating vehicle, the third avoidance boundary being smaller in size than the first and second avoidance boundaries.

16. The controller according to claim 2, wherein the optimal control problem does not include at least one of (1) an avoidance constraint between the first coordinating vehicle and another vehicle and (2) an avoidance constraint between the first coordinating vehicle and a road boundary.

17. The controller according to claim 2, wherein the optimal control problem does not include an avoidance constraint between the first coordinating vehicle and another vehicle and does not include an avoidance constraint between the first coordinating vehicle and a road boundary.

18. The controller according to claim 2, wherein the computer processor is further configured to control the first coordinating vehicle based upon the optimized trajectory.

19. A vehicle coordination system comprising a plurality of coordinating vehicles, each vehicle (i=1, 2, 3, . . . , N) having a controller including:
a communication terminal configured to receive trajectory messages from each vehicle, of the plurality of coordinating vehicles, in a communication range, the trajectory messages including vehicle trajectory information for a predetermined update interval; and
a computer processor configured to execute instructions stored on a non-transitory memory, the instructions including:
calculating an assumed trajectory by solving an optimal control problem, the optimal control problem not including an avoidance constraint,
for each received trajectory message, detecting a conflict with a corresponding vehicle based on the received trajectory information and the calculated assumed trajectory, and
when a conflict is detected, adjusting terminal state constraints in the optimal control problem and calculating, with the adjusted constraints in the optimal control problem, an optimized trajectory for the first coordinating vehicle such that the detected conflict is resolved, wherein the optimal control problem includes cost terms including a move suppression (MS) term indicating an amount that the optimized trajectory may deviate from the assumed trajectory.

* * * * *